(12) United States Patent
Esseghir et al.

(10) Patent No.: US 10,573,429 B2
(45) Date of Patent: Feb. 25, 2020

(54) CABLE JACKETS HAVING DESIGNED MICROSTRUCTURES AND METHODS FOR MAKING CABLE JACKETS HAVING DESIGNED MICROSTRUCTURES

(71) Applicant: Dow Global Technologies LLC, Midland, MI (US)

(72) Inventors: Mohamed Esseghir, Collegeville, PA (US); Wenyi Huang, Midland, MI (US); Joseph Dooley, Charlestown, IN (US); Patrick Chang Dong Lee, Burlington, VT (US); Saswati Pujari, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/528,605

(22) PCT Filed: Dec. 3, 2015

(86) PCT No.: PCT/US2015/063578
§ 371 (c)(1),
(2) Date: May 22, 2017

(87) PCT Pub. No.: WO2016/099908
PCT Pub. Date: Jun. 23, 2016

(65) Prior Publication Data
US 2017/0278593 A1 Sep. 28, 2017

Related U.S. Application Data

(60) Provisional application No. 62/094,432, filed on Dec. 19, 2014.

(51) Int. Cl.
*H01B 3/00* (2006.01)
*H01B 7/28* (2006.01)
(Continued)

(52) U.S. Cl.
CPC ............ *H01B 7/28* (2013.01); *H01B 7/0208* (2013.01); *H01B 7/04* (2013.01); *Y02A 30/14* (2018.01)

(58) Field of Classification Search
CPC .................................. H01B 3/00; H01B 7/08
(Continued)

(56) References Cited

U.S. PATENT DOCUMENTS 3,529,340 A * 9/1970 Polizzano et al. .......................... H01B 11/1839
174/110 F
3,663,739 A * 5/1972 Chevrier .................. H01B 7/08
174/117 F
(Continued)

FOREIGN PATENT DOCUMENTS

WO 2005/056272 A1 6/2005
WO 2008/044122 A2 4/2008
(Continued)

OTHER PUBLICATIONS

Dow Global Technologies LLC U.S. Appl. No. 61/993,341, filed May 15, 2014.
(Continued)

*Primary Examiner* — Chau N Nguyen

(57) ABSTRACT

Coated conductors comprising a conductor and elongated polymeric coatings at least partially surrounding the conductor, where the elongated polymeric coatings comprise a polymeric matrix material and a plurality of microcapillaries defining individual, discrete void spaces. Such coated conductors are lighter in weight relative to coated conductors having polymeric coatings without microcapillaries. Also disclosed are dies and methods for making such coated conductors.

9 Claims, 24 Drawing Sheets

(51) Int. Cl.
*H01B 7/02* (2006.01)
*H01B 7/04* (2006.01)

(58) Field of Classification Search
USPC ................................. 174/110 R, 110 F, 117 F
See application file for complete search history.

(56) References Cited

U.S. PATENT DOCUMENTS

| | | | | |
|---|---|---|---|---|
| 4,197,423 | A * | 4/1980 | Fusen | H01B 7/14 174/107 |
| 4,317,000 | A * | 2/1982 | Ferer | H01B 7/182 138/130 |
| 4,731,505 | A * | 3/1988 | Crenshaw | G02B 6/443 138/110 |
| 5,042,904 | A * | 8/1991 | Story | G02B 6/4416 174/107 |
| 5,306,869 | A * | 4/1994 | Springer | H01B 7/0861 156/53 |
| 5,990,419 | A * | 11/1999 | Bogese, II | H01B 7/184 174/113 AS |
| 6,501,027 | B1 | 12/2002 | Belli et al. | |
| 7,132,604 | B2 | 11/2006 | Scheidecker et al. | |
| 7,166,802 | B2 | 1/2007 | Cusson et al. | |
| 7,238,886 | B2 * | 7/2007 | Wiekhorst | H01B 7/0233 174/110 R |
| 7,405,360 | B2 * | 7/2008 | Clark | H01B 11/06 174/113 AS |
| 8,227,697 | B2 * | 7/2012 | Varkey | H01B 7/046 174/102 R |
| 8,455,761 | B2 * | 6/2013 | Hayashishita | H01B 11/1839 174/110 R |
| 8,735,726 | B2 * | 5/2014 | Skocypec | H01B 7/185 174/110 R |
| 2006/0045443 | A1 * | 3/2006 | Blazer | G02B 6/4404 385/114 |
| 2007/0098940 | A1 * | 5/2007 | Heffner | H01B 13/14 428/36.9 |
| 2009/0200059 | A1 | 8/2009 | Cinquemani et al. | |
| 2009/0214167 | A1 * | 8/2009 | Lookadoo | G02B 6/4429 385/100 |
| 2013/0062095 | A1 * | 3/2013 | Huang | H01B 7/083 174/113 R |

FOREIGN PATENT DOCUMENTS

| | | |
|---|---|---|
| WO | 2011/025698 A1 | 3/2011 |
| WO | 2012/094315 A1 | 7/2012 |
| WO | 2012/094317 A1 | 7/2012 |
| WO | 2013/009538 A2 | 1/2013 |
| WO | 2014/003758 A1 | 1/2014 |
| WO | 2014/003761 A1 | 1/2014 |

OTHER PUBLICATIONS

Dow Global Technologies LLC U.S. Appl. No. 61/939,313, filed Feb. 13, 2014.
PCT/US2015/063578, dated Mar. 22, 2016.
International Search Report and Written Opinion.

* cited by examiner

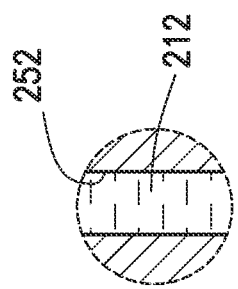
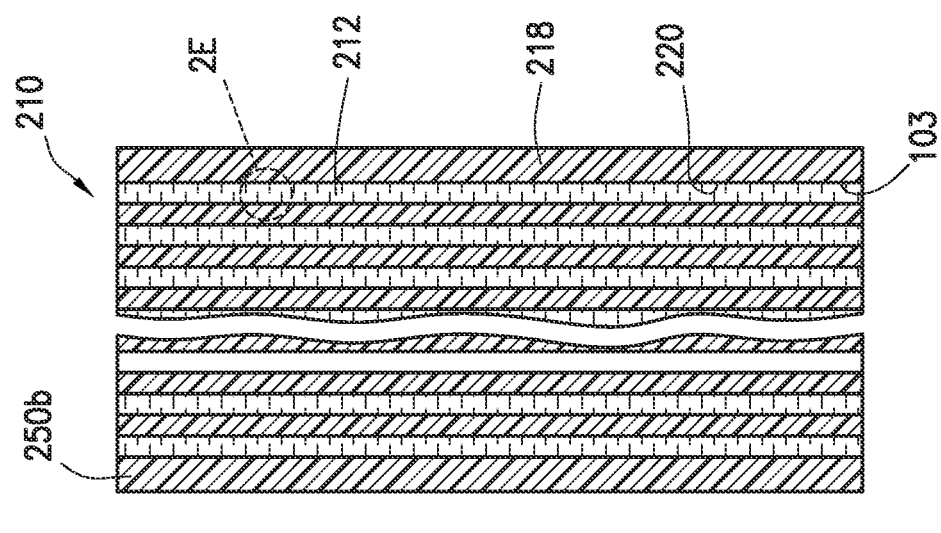
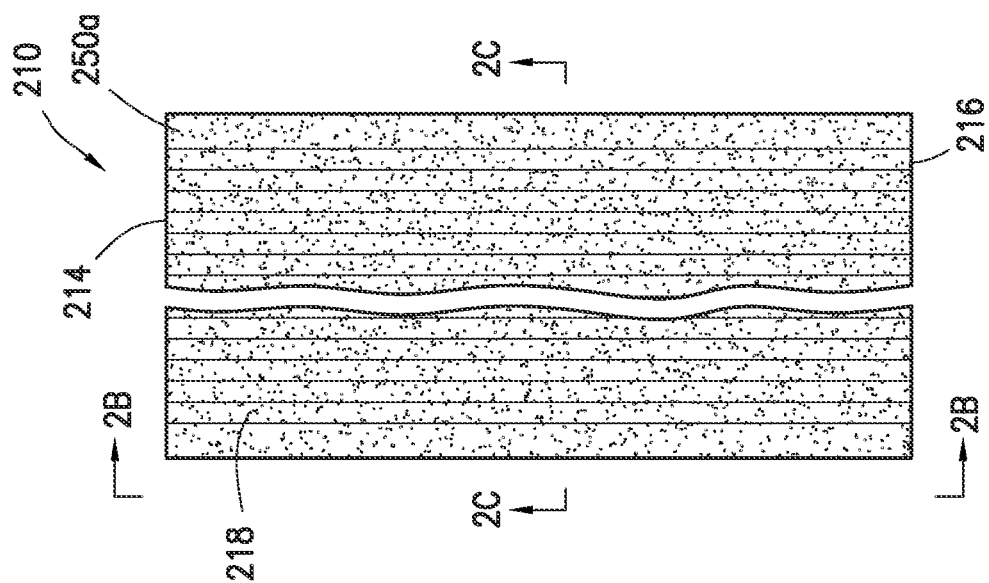

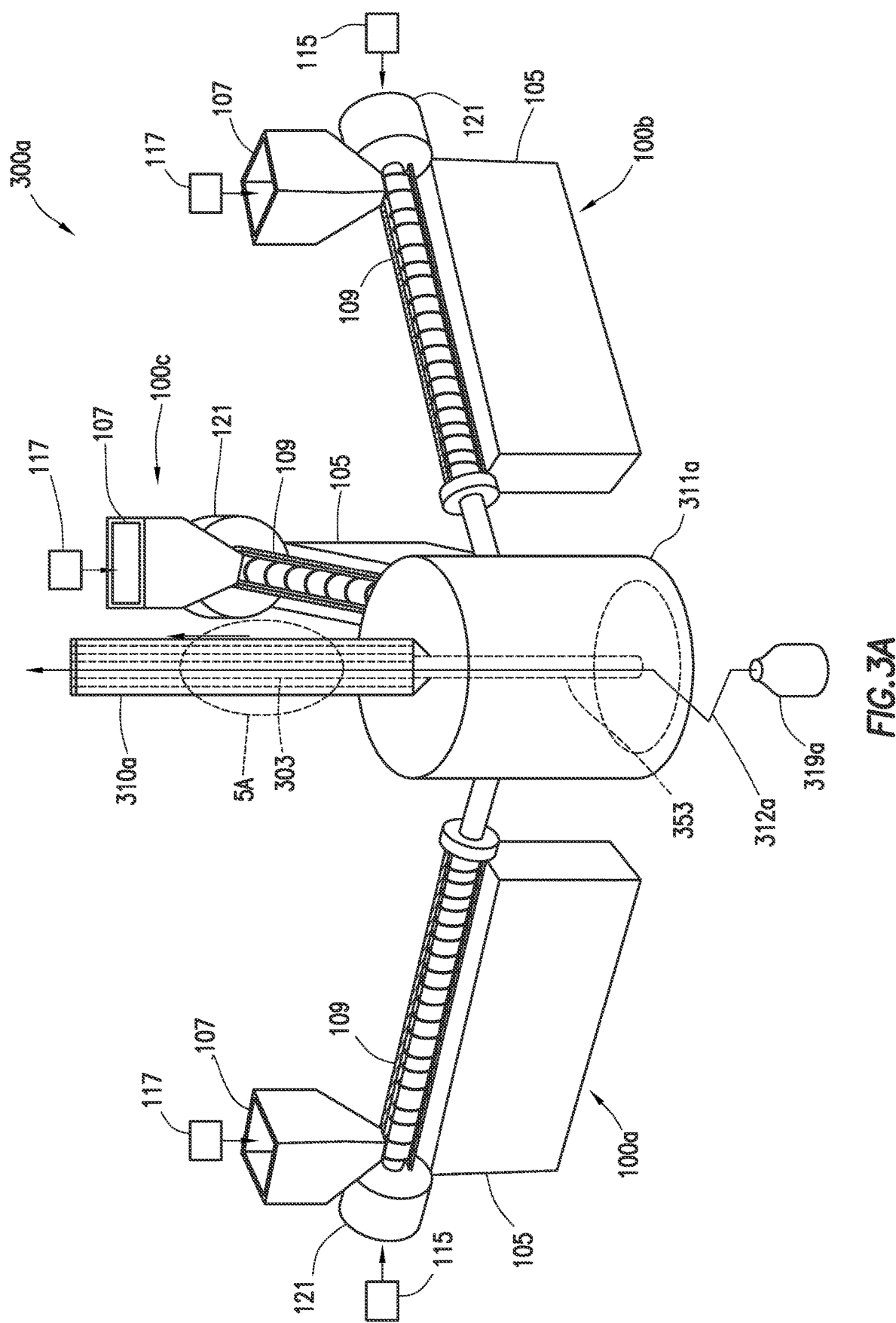

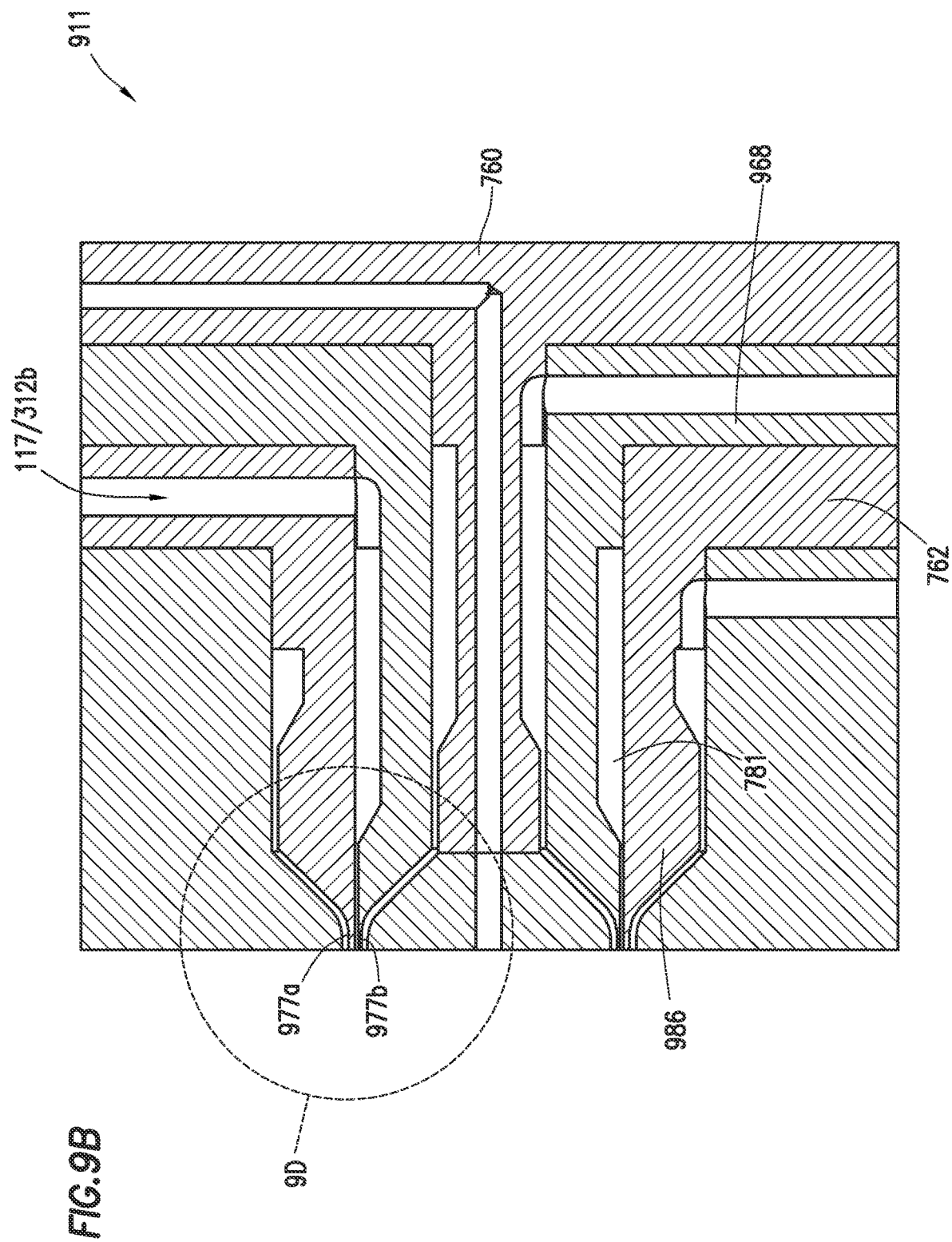

CABLE JACKETS HAVING DESIGNED MICROSTRUCTURES AND METHODS FOR MAKING CABLE JACKETS HAVING DESIGNED MICROSTRUCTURES

REFERENCE TO RELATED APPLICATIONS

The present application claims the benefit of U.S. Provisional Application No. 62/094,432, filed on Dec. 19, 2014.

FIELD

Various embodiments of the present invention relate to cable coatings and jackets having microcapillary structures.

INTRODUCTION

Lightweight power and telecommunications technology is desired for reduced infrastructure cost as well as for allowing easier installation. Approaches to reduce the weight in power and telecommunications cable coatings (e.g., jackets) have generally been focused on introducing low levels of foaming into the polymer forming the jacket (e.g., polyethylene) to lower the polymer's density and thereby reduce the weight of the jacket. However, typical foaming processes result in a random distribution of void-space cells within the polymer. This leads to a deterioration of the mechanical properties of the foamed polymer, with void-space cells acting as weak spots leading to rapid failure under deformation. Accordingly, improvements are desired in lower-density coatings for power and telecommunications cables.

SUMMARY

One embodiment is a coated conductor, comprising:
(a) a conductor; and
(b) an elongated polymeric coating surrounding at least a portion of said conductor,
wherein said elongated polymeric coating comprises a polymeric matrix material and a plurality of microcapillaries which extend substantially in the direction of elongation of said elongated polymeric coating,
wherein said microcapillaries define individual, discrete void spaces surrounded by said polymeric matrix material when viewed from a cross section taken orthogonal to the direction of elongation of said elongated polymeric coating.

BRIEF DESCRIPTION OF THE DRAWINGS

Reference is made to the accompanying drawings in which:

FIG. 2A is a longitudinal-sectional view of a microcapillary film;

FIGS. 2B and 2C are cross-sectional views of a microcapillary film;

FIG. 2E is a segment 2E of a longitudinal sectional view of the microcapillary film, as shown in FIG. 2B;

FIGS. 3A and 3B are schematic perspective views of various configurations of extruder assemblies including an annular die assembly for manufacturing coextruded multi-layer annular microcapillary products and air-filled multi-layer annular microcapillary products, respectively;

FIGS. 9A-9D are partial cross-sectional, longitudinal cross-sectional, end, and detailed cross-sectional views, respectively, of an annular die assembly in a symmetric flow configuration;

DETAILED DESCRIPTION

The present disclosure relates to die assemblies and extruders for producing annular microcapillary products. Such annular microcapillary products may be used in fabricating wire and cable articles of manufacture, such as by forming at least a portion of a polymeric coating (e.g., a jacket) or a polymeric protective component surrounding a conductive core.

The die assembly includes an annular die insert positioned between manifolds and defining material flow channels therebetween for extruding layers of a thermoplastic material. The die insert has a tip having microcapillary flow channels on an outer surface for insertion of microcapillary material in microcapillaries between the extruded layers of thermoplastic material. The microcapillaries may contain a variety of materials, such as other thermoplastic materials or elastomeric materials, or may simply be void-space microcapillaries (i.e., containing a gas, such as air). The die assemblies for producing annular microcapillary products are a variation of die assemblies for producing multi-layer microcapillary films, both of which are described in greater detail, below.

Microcapillary Film Extruder

Figure 1:
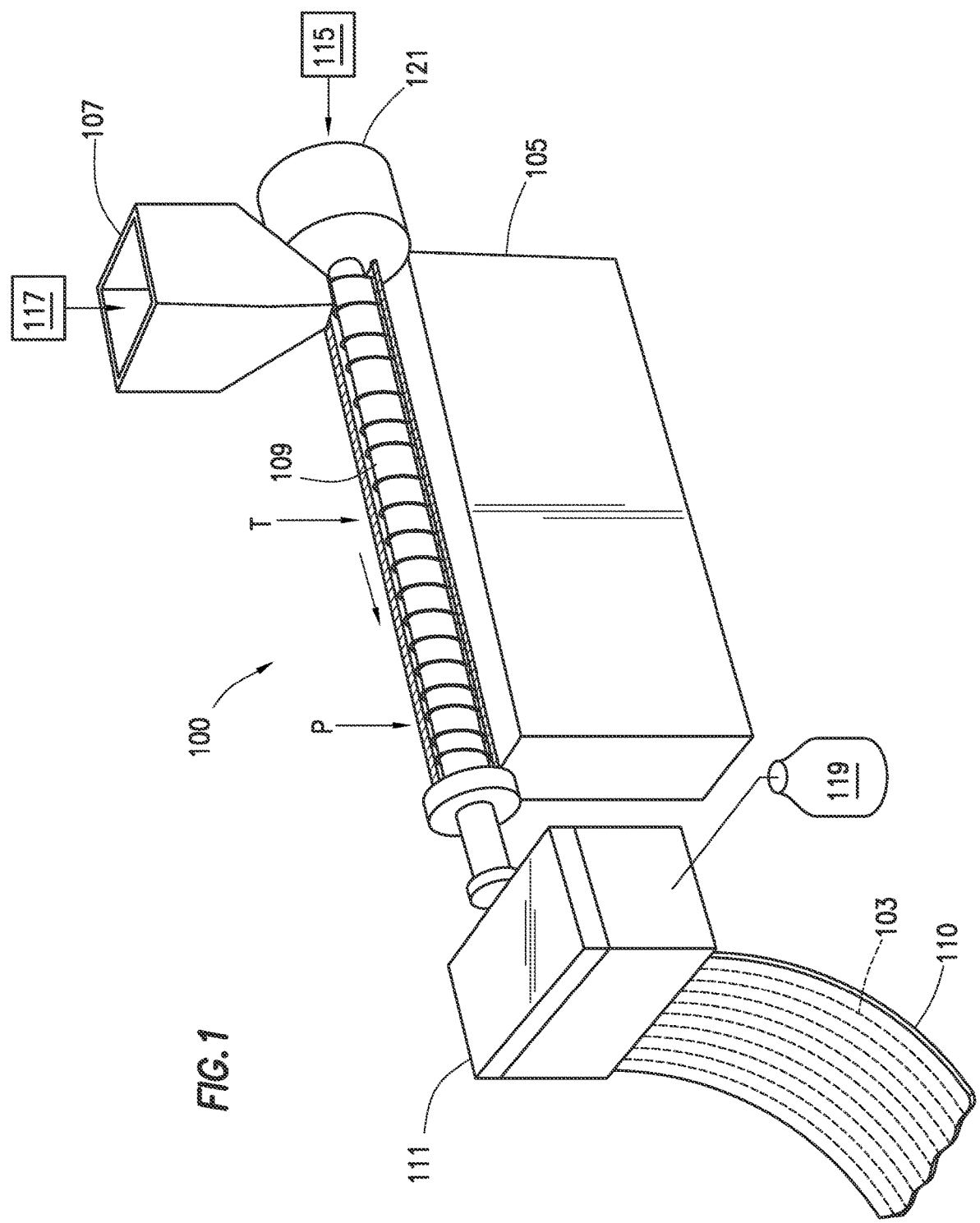
FIG. 1 is a perspective view, partially in cross-section, of an extruder with a die assembly for manufacturing a microcapillary film.

FIG. 1 depicts an example extruder (100) used to form a multi-layer polymeric film (110) with microcapillaries (103). The extruder (100) includes a material housing (105), a material hopper (107), a screw (109), a die assembly (111) and electronics (115). The extruder (100) is shown partially in cross-section to reveal the screw (109) within the material housing (105). While a screw type extruder is depicted, a variety of extruders (e.g., single screw, twin screw, etc.) may be used to perform the extrusion of the material through the extruder (100) and die assembly (111). One or more extruders may be used with one or more die assemblies. Electronics (115) may include, for example, controllers, processors, motors and other equipment used to operate the extruder.

Raw materials (e.g. thermoplastic materials) (117) are placed into the material hopper (107) and passed into the housing (105) for blending. The raw materials (117) are heated and blended by rotation of the screw (109) rotationally positioned in the housing (105) of the extruder (100). A motor (121) may be provided to drive the screw (109) or other driver to advance the raw materials (117). Heat and pressure are applied as schematically depicted from a heat source T and a pressure source P (e.g., the screw (109)), respectively, to the blended material to force the raw material (117) through the die assembly (111) as indicated by the arrow. The raw materials (117) are melted and conveyed through the extruder (100) and die assembly (111). The molten raw material (117) passes through die assembly (111) and is formed into the desired shape and cross section (referred to herein as the 'profile'). The die assembly (111) may be configured to extrude the molten raw material (117) into thin sheets of the multi-layer polymeric film (110) as is described further herein.

Microcapillary Film

FIGS. 2A-2F depict various views of a multi-layer film (210) which may be produced, for example, by the extruder (100) and die assembly (111) of FIG. 1. As shown in FIGS. 2A-2F, the multi-layer film (210) is a microcapillary film. The multi-layer film (210) is depicted as being made up of multiple layers (250a,b) of thermoplastic material. The film (210) also has channels (220) positioned between the layers (250a,b).

Figure 2C:
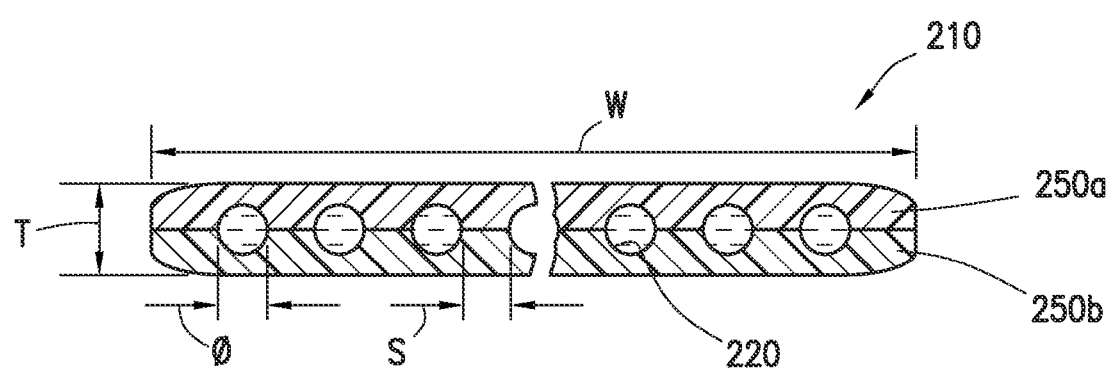
Figure 2D:
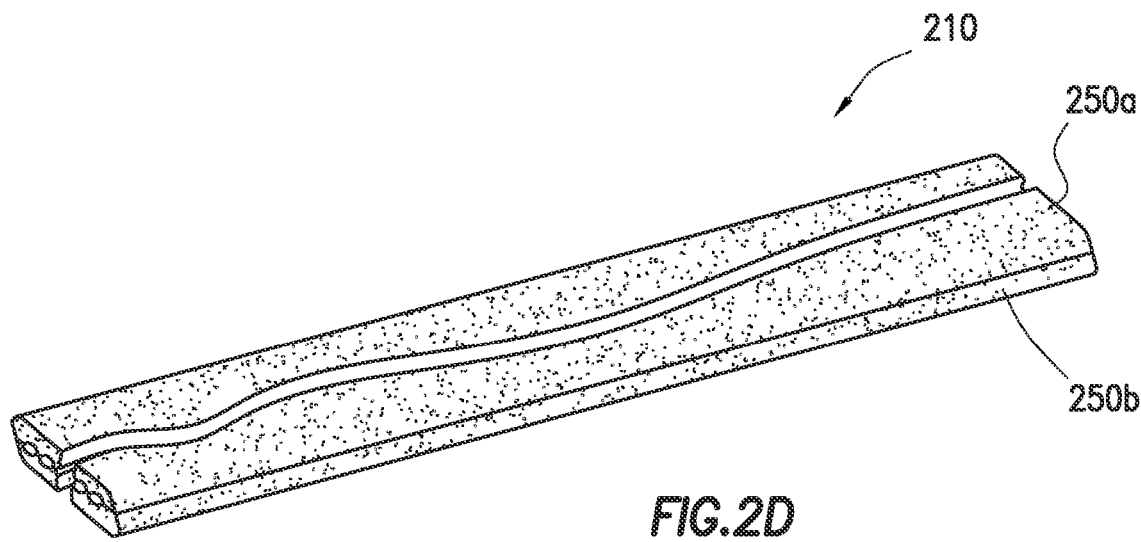
FIG. 2D is an elevated view of a microcapillary film.
Figure 2F:
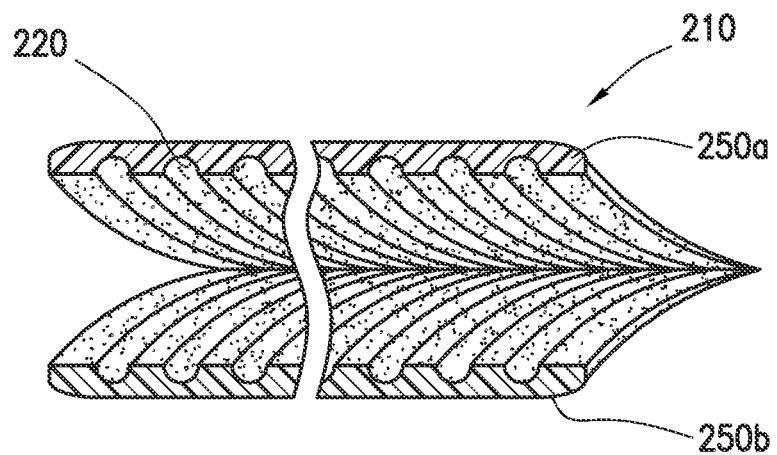
FIG. 2F is an exploded view of a microcapillary film.

The multi-layer film (210) may also have an elongate profile as shown in FIG. 2C. This profile is depicted as having a wider width W relative to its thickness T. The width W may be in the range of from 3 inches (7.62 cm) to 60 inches (152.40 cm) and may be, for example, 24 inches (60.96 cm) in width, or in the range of from 20 to 40 inches (50.80-101.60 cm), or in the range of from 20 to 50 inches (50.80-127 cm), etc. The thickness T may be in the range of from 100 to 2,000 µm (e.g., from 250 to 2000 µm). The channels (220) may have a dimension φ (e.g., a width or diameter) in the range of from 50 to 500 µm (e.g., from 100 to 500 µm, or 250 to 500 µm), and have a spacing S between the channels (220) in the range of from 50 to 500 µm (e.g., from 100 to 500 µm, or 250 to 500 µm). As further described below, the selected dimensions may be proportionally defined. For example, the channel dimension φ may be a diameter of about 30% of thickness T.

As shown, layers (250a,b) are made of a matrix thermoplastic material and channels (220) have a channel fluid (212) therein. The channel fluid may comprise, for example, various materials, such as air, gas, polymers, etc., as will be described further herein. Each layer (250a,b) of the multi-layer film (210) may be made of various polymers, such as those described further herein. Each layer may be made of the same material or of a different material. While only two layers (250a,b) are depicted, the multi-layer film (210) may have any number of layers of material.

Figure 2G:
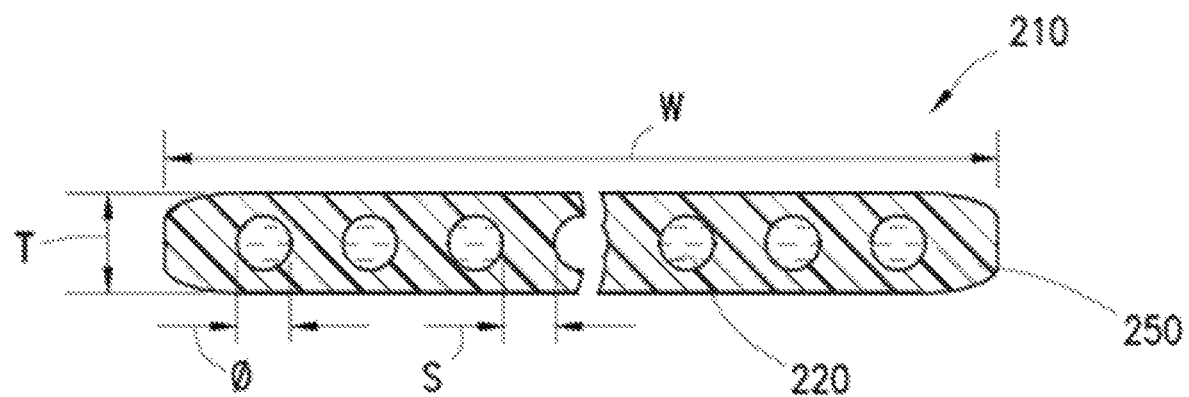
FIG. 2G is a cross-sectional view of a microcapillary film particularly depicting a single-layer embodiment.

It should be noted that when the same thermoplastic material is employed for the layers (250a,b), then a single layer (250) can result in the final product, due to fusion of the two streams of the matrix layers comprised of the same polymer in a molten state merging shortly before exiting the die. This phenomenon is depicted in FIG. 2G.

Channels (220) may be positioned between one or more sets of layers (250a,b) to define microcapillaries (252) therein. The channel fluid (212) may be provided in the channels (220). Various numbers of channels (220) may be provided as desired. The multiple layers may also have the same or different profiles (or cross-sections). The characteristics, such as shape of the layers (250a,b) and/or channels (220) of the multi-layer film (210), may be defined by the configuration of the die assembly used to extrude the thermoplastic material as will be described more fully herein.

The microcapillary film (210) may have a thickness in the range of from 100 µm to 3,000 µm; for example, microcapillary film or foam (210) may have a thickness in the range of from 100 to 2,000 µm, from 100 to 1,000 µm, from 200 to 800 µm, from 200 to 600 µm, from 300 to 1,000 µm, from 300 to 900 µm, or from 300 to 700 µm. The film-thickness-to-microcapillary-diameter ratio can be in the range of from 2:1 to 400:1.

The microcapillary film (210) may comprise at least 10 percent by volume ("vol %") of the matrix (218), based on the total volume of the microcapillary film (210); for example, the microcapillary film (210) may comprise from 10 to 80 vol % of the matrix (218), from 20 to 80 vol % of the matrix (218), or from 30 to 80 vol % of the matrix (218), based on the total volume of the microcapillary film (210).

The microcapillary film (210) may comprise from 20 to 90 vol % of voidage, based on the total volume of the microcapillary film (210); for example, the microcapillary film (210) may comprise from 20 to 80 vol % of voidage, from 20 to 70 vol % of voidage, or from 30 to 60 vol % of voidage, based on the total volume of the microcapillary film (210).

The microcapillary film (210) may comprise from 50 to 100 vol % of the channel fluid (212), based on the total voidage volume, described above; for example, the microcapillary film (210) may comprise from 60 to 100 vol % of the channel fluid (212), from 70 to 100 vol % of the channel fluid (212), or from 80 to 100 vol % of the channel fluid (212), based on the total voidage volume, described above.

The microcapillary film (210) has a first end (214) and a second end (216). One or more channels (220) are disposed in parallel in the matrix (218) from the first end (214) to the second end (216). The one or more channels (220) may be, for example, at least about 250 µm apart from each other. The one or more channels (220) can have a diameter of at least 250 µm, or in the range of from 250 to 1990 µm, from 250 to 990 µm, from 250 to 890 µm, from 250 to 790 µm, from 250 to 690 µm, or from 250 to 590 µm. The one or more channels (220) may have a cross sectional shape selected from the group consisting of circular, rectangular, oval, star, diamond, triangular, square, the like, and combinations thereof. The one or more channels (220) may further include one or more seals at the first end (214), the second end (216), therebetween the first end (214) and the second end (216), or combinations thereof.

The matrix (218) comprises one or more matrix thermoplastic materials. Such matrix thermoplastic materials include, but are not limited to, polyolefins (e.g., polyethylenes, polypropylenes, etc.); polyamides (e.g., nylon 6); polyvinylidene chloride; polyvinylidene fluoride; polycarbonate; polystyrene; polyethylene terephthalate; polyurethane; and polyester. Specific examples of matrix thermoplastic materials include those listed on pages 5 through 11 of PCT Published Application No. WO 2012/094315, titled "Microcapillary Films and Foams Containing Functional Filler Materials," which are herein incorporated by reference.

The matrix (218) may be reinforced via, for example, glass or carbon fibers and/or any other mineral fillers such talc or calcium carbonate. Exemplary fillers include, but are not limited to, natural calcium carbonates (e.g., chalks, calcites and marbles), synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

The one or more channel fluids (212) may include a variety of fluids, such as air, other gases, or channel thermoplastic material. Channel thermoplastic materials include, but are not limited to, polyolefins (e.g., polyethylenes, polypropylenes, etc.); polyamides (e.g., nylon 6); polyvinylidene chloride; polyvinylidene fluoride; polycarbonate; polystyrene; polyethylene terephthalate; polyurethane; and polyester. As with the matrix (218) materials discussed above, specific examples of thermoplastic materials suitable for use as channel fluids (212) include those listed on pages 5 through 11 of PCT Published Application No. WO 2012/094315.

When a thermoplastic material is used as the channel fluid (212), it may be reinforced via, for example, glass or carbon fibers and/or any other mineral fillers such talc or calcium carbonate. Exemplary reinforcing fillers include those listed above as suitable for use as fillers in the matrix (218) thermoplastic material.

Annular Microcapillary Product Extruder Assemblies

Figure 3B:
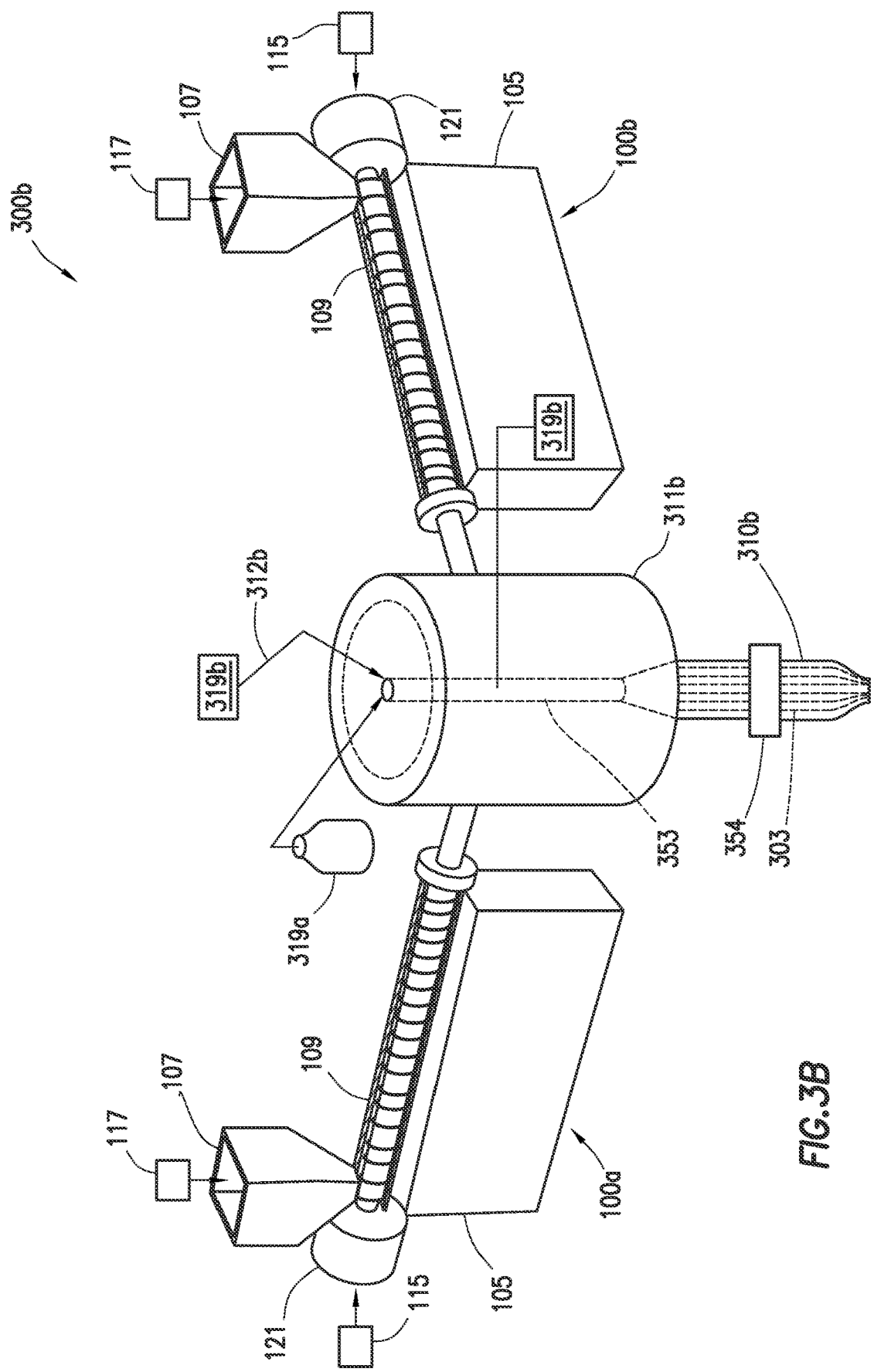
Figure 4A:
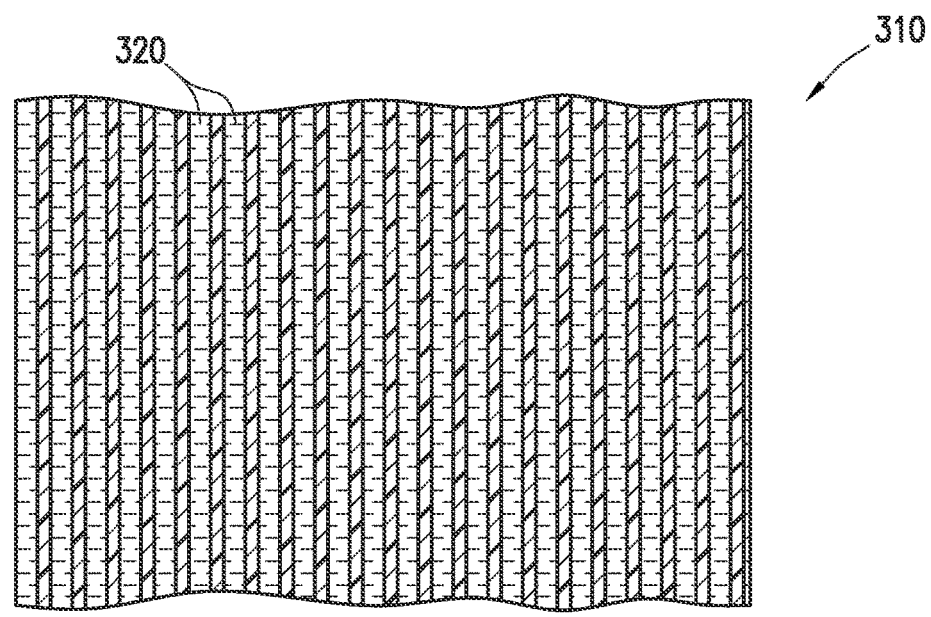
FIG. 4A is a schematic view of a microcapillary film having microcapillaries with a fluid therein.
Figure 4B:
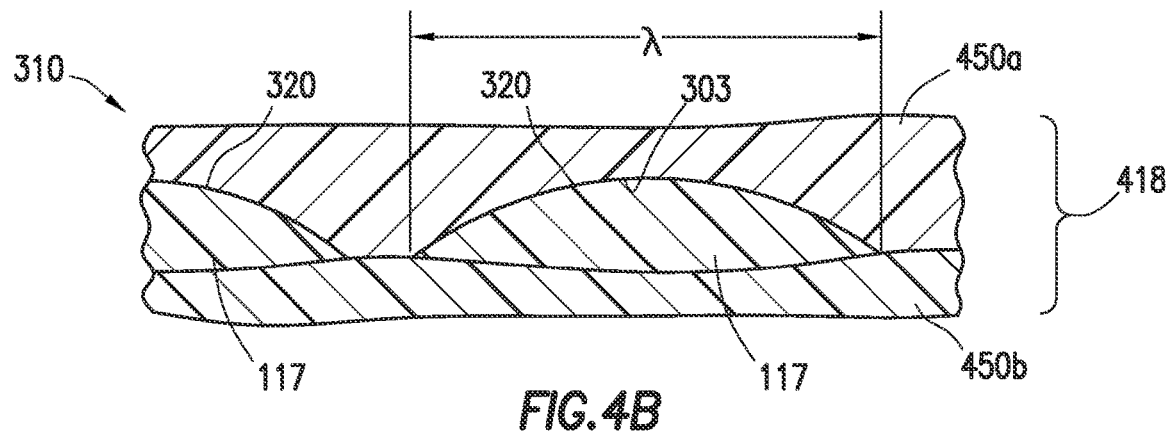
FIG. 4B is a cross-sectional view of a coextruded microcapillary film.
Figure 4C:
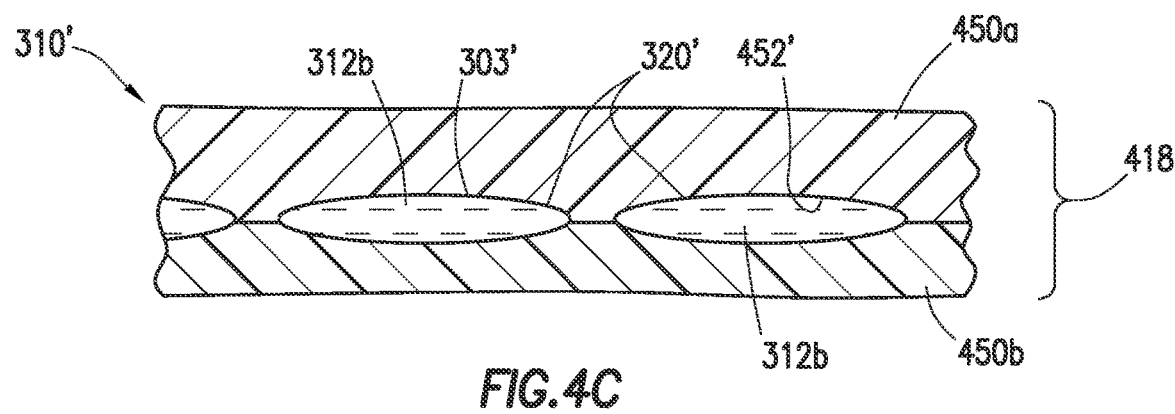
FIG. 4C is a cross-sectional view of an inventive air-filled microcapillary film.
Figure 5:
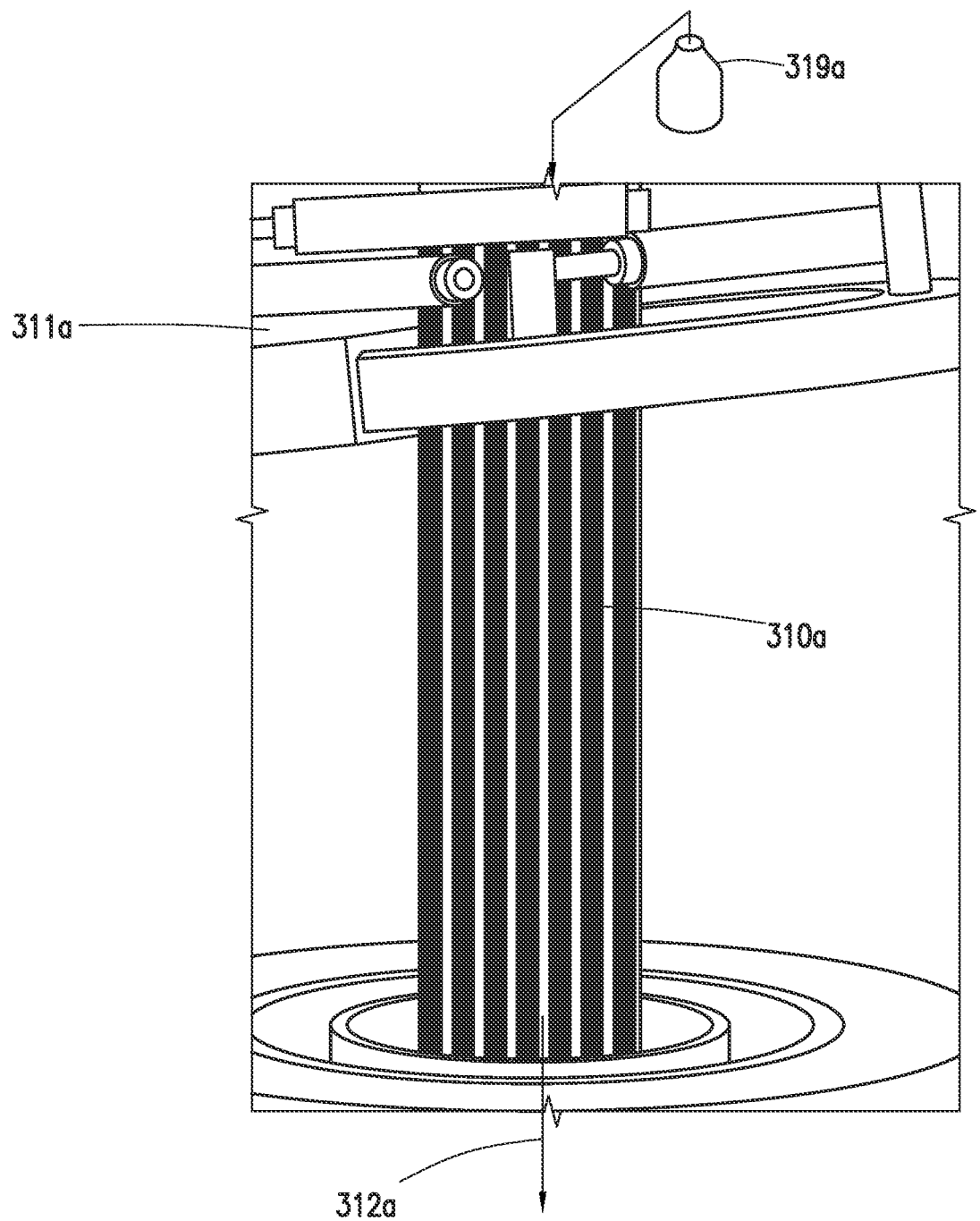
FIG. 5 is a schematic view of an annular microcapillary tubing extruded from a die assembly.
Figure 6B:
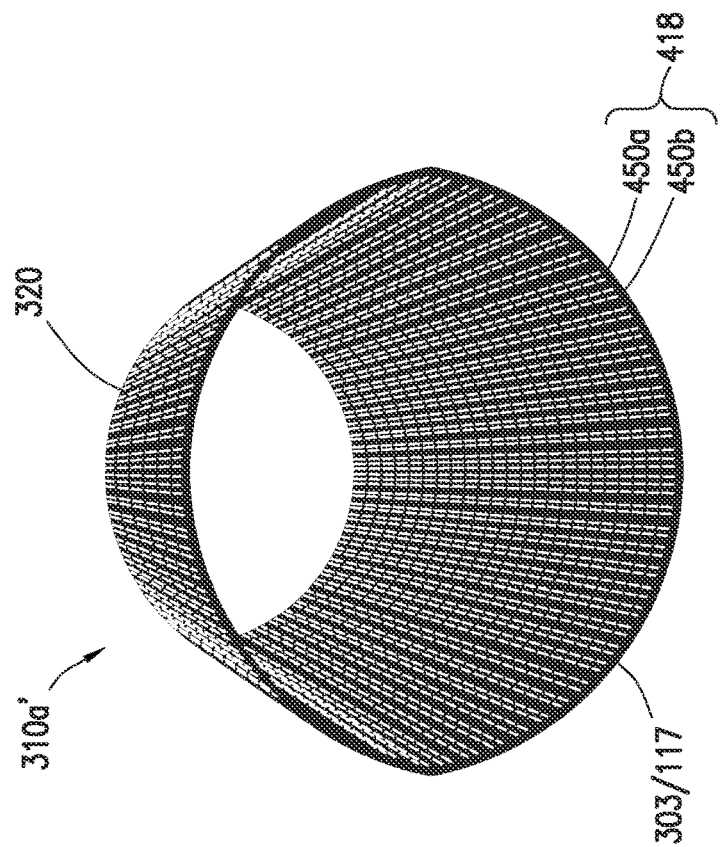
FIGS. 6A and 6B are perspective views of an annular microcapillary tubing.
Figure 6A:
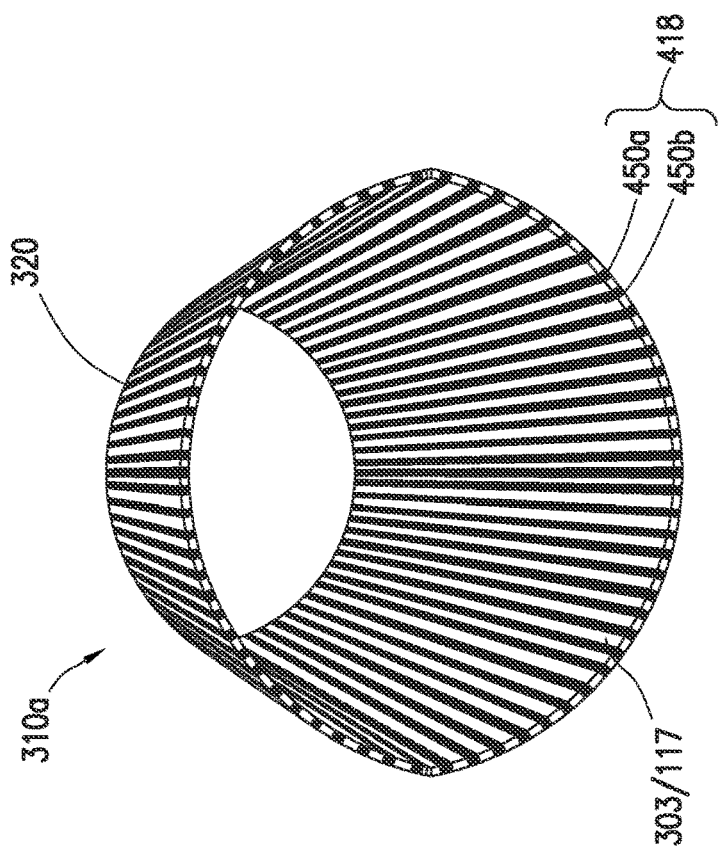

FIGS. 3A and 3B depict example extruder assemblies (300a,b) used to form a multi-layer, annular microcapillary product (310a,b) having microcapillaries (303). The extruder assemblies (300a,b) may be similar to the extruder (100) of FIG. 1 as previously described, except that the extruder assemblies (300a,b) include multiple extruders (100a,b,c), with combined annular microcapillary co-extrusion die assemblies (311a,b) operatively connected thereto. The annular die assemblies (311a,b) have die inserts (353) configured to extrude multi-layer, annular microcapillary products, such as film (310) as shown in FIGS. 4A-4C, tubing (310a) as shown in FIGS. 5, 6A, and 6B, and/or molded shapes (310b) as shown in FIG. 3B.

FIG. 3A depicts a first configuration of an extruder assembly (300a) with three extruders (100a,b,c) operatively connected to the combined annular microcapillary co-extrusion die assembly (311a). In an example, two of the three extruders may be matrix extruders (100a,b) used to supply thermoplastic material (e.g., polymer) (117) to the die assembly (311a) to form layers of the annular microcapillary product (310a). A third of the extruders may be a microcapillary (or core layer) extruder (100c) to provide a microcapillary material, such as a thermoplastic material (e.g., polymer melt) (117), into the microcapillaries (303) to form a microcapillary phase (or core layer) therein.

The die insert (353) is provided in the die assembly (311a) to combine the thermoplastic material (117) from the extruders (100a,b,c) into the annular microcapillary product (310a). As shown in FIG. 3A, the multi-layer, annular microcapillary product may be a blown tubing (310a) extruded upwardly through the die insert (353) and out the die assembly (311a). Annular fluid (312a) from a fluid source (319a) may be passed through the annular microcapillary product (310a) to shape the multi-layer, annular microcapillary tubing (310a) during extrusion as shown in FIG. 3A, or be provided with a molder (354) configured to produce a multi-layer, annular microcapillary product in the form of an annular microcapillary molding (or molded product), such as a bottle (310b) as shown in FIG. 3B.

FIG. 3B shows a second configuration of an extruder assembly (300b). The extruder assembly (300b) is similar to the extruder assembly (300a), except that the microcapillary extruder (100c) has been replaced with a microcapillary fluid source (319b). The extruders (100a,b) extrude thermoplastic material (as in the example of FIG. 3A) and the microcapillary fluid source (319b) may emit micocapillary material in the form of a microcapillary fluid (312b) through the die insert (353) of the die assembly (311b). The two matrix extruders (100a,b) emit thermoplastic layers, with the microcapillary fluid source (319b) emitting microcapillary fluid (312b) into the microcapillaries (303) therebetween to form the multi-layer, annular microcapillary product (310b). In this version, the annular die assembly (311b) may form film or blown products as in FIG. 3A, or be provided with a molder (354) configured to produce a multi-layer, annular microcapillary product in the form of an annular microcapillary molding (or molded product), such as a bottle, (310b).

While FIGS. 3A and 3B show each extruder (100a,b,c) as having a separate material housing (105), material hopper (107), screw (109), electronics (115), motor (121), part or all of the extruders (100) may be combined. For example, the extruders (100a,b,c) may each have their own hopper (107), and share certain components, such as electronics (115) and die assembly (311a,b). In some cases, the fluid sources (319a,b) may be the same fluid source providing the same fluid (312a,b), such as air.

The die assemblies (311a,b) may be operatively connected to the extruders (100a,b,c) in a desired orientation, such as a vertical upright position as shown in FIG. 3A, a vertical downward position as shown in FIG. 3B, or a horizontal position as shown in FIG. 1. One or more extruders may be used to provide the polymeric matrix material that forms the layers and one or more material sources, such as extruder (100c) and/or microcapillary fluid source (319b), may be used to provide the microcapillary material. Additionally, as described in more detail below, the die assemblies may be configured in a crosshead position for co-extrusion with a conductor or conductive core.

Annular Microcapillary Products

FIGS. 4A-4C depict various views of a multi-layer, annular microcapillary product which may be in the form of a film (310, 310') produced, for example, by the extruders (300a,b) and die assemblies (311a,b) of FIGS. 3A and/or 3B. As shown in FIGS. 4A and 4B, the multi-layer, annular microcapillary product (310) may be similar to the multi-layer film (210), except that the multi-layer, annular microcapillary product (310) is formed from the annular die assemblies (311a,b) into polymeric matrix layers (450a,b) with microcapillaries (303, 303') therein. The polymeric matrix layers (450a,b) collectively form a polymeric matrix (418) of the annular microcapillary product (310). The layers (450a,b) have parallel, linear channels (320) defining microcapillaries (303) therein.

As shown in FIGS. 4B and 4C, the multi-layer, annular microcapillary product (310, 310') may be extruded with various microcapillary material (117) or microcapillary fluid (312b) therein. The microcapillaries may be formed in channels (320, 320') with various cross-sectional shapes. In the example of FIG. 4B, the channels (320) have an arcuate cross-section defining the microcapillaries (303) with the microcapillary material (117) therein. The microcapillary material (117) is in the channels (320) between the matrix layers (450a,b) that form the polymeric matrix (418). The microcapillary material (117) forms a core layer between the polymeric matrix layers (450a,b).

In the example of FIG. 4C, the channels (320') have another shape, such as an elliptical cross-section defining microcapillaries (303') with the microcapillary material (312b) therein. The microcapillary material (312b) is depicted as fluid (e.g., air) in the channels (320') between the layers (450a,b) that form the polymeric matrix (418).

It should be noted that, as with the films described above, the annular microcapillary product can also take the form of a single-layer product when the same matrix material is employed for the layers (450a,b). This is due to the fusion of the two streams of the matrix layers in a molten state merging shortly before exiting the die.

The materials used to form the annular microcapillary products as described herein may be selected for a given application. For example, the material may be a plastic, such as a thermoplastic or thermoset material. When a thermoplastic material is employed, the thermoplastic material (117) forming the polymeric matrix (418) and/or the microcapillary material (117) may be selected from those materials useful in forming the film (210) as described above. Accordingly, the annular microcapillary products may be made of various materials, such as polyolefins (e.g., polyethylene or polypropylene). For example, in FIGS. 4A and 4B, the polymeric matrix (418) may be a low-density polyethylene and the microcapillary material (117) may be polypropylene. As another example, in FIG. 4C the polymeric matrix (418) can be made of low-density polyethylene with air as the microcapillary material (312b).

Referring to FIG. 5, the fluid source (319a) may pass annular fluid (e.g., air) (312a) through the annular microcapillary product (310a) to support the tubular shape during extrusion. The die assembly (311a) may form the multi-layer, annular microcapillary product (310a,310a') into a tubular shape as shown in FIGS. 6A-6B.

As also shown by FIGS. 6A and 6B, the thermoplastic materials forming portions of the multi-layer, annular microcapillary product (310a,310a') may be varied. In the example shown in FIGS. 4A, 4B, and 6A, the layers (450a, b) forming polymeric matrix (418) may have a different material from the microcapillary material (117) in the microcapillaries (303) as schematically indicated by the black channels (320) and white polymeric matrix (418). In another example, as shown in FIG. 6B, the layers (450a,b) forming a polymeric matrix (418) and the material in microcapillaries (303) may be made of the same material, such as low-density polyethylene, such that the polymeric matrix (418) and the channels (320) are both depicted as black.

Die Assemblies for Annular Microcapillary Products

FIGS. 7A-9D depict example configurations of die assemblies (711,811,911) usable as the die assembly (311). While FIGS. 7A-9D show examples of possible die assembly configurations, combinations and/or variations of the various examples may be used to provide the desired multi-layer, annular microcapillary product, such as those shown in the examples of FIGS. 4A-6B.

FIGS. 7A-7D depict partial cross-sectional, longitudinal cross-sectional, end, and detailed cross-sectional views, respectively, of the die assembly (711). FIGS. 8A-8D depict partial cross-sectional, longitudinal cross-sectional, end, and detailed cross-sectional views, respectively, of the die assembly (811). FIGS. 9A-9D depict partial cross-sectional, longitudinal cross-sectional, end, and detailed cross-sectional views, respectively, of the die assembly (911). The die assemblies (711, 811) may be used, for example, with the extruder assembly (300a) of FIG. 3A and the die assembly (911) may be used, for example, with the extruder assembly (300b) of FIG. 3B to form multi-layer, annular microcapillary products, such as those described herein.

As shown in FIGS. 7A-7D the die assembly (711) includes a shell (758), an inner manifold (760), an outer manifold (762), a cone (764), and a die insert (768). The shell (758) is a tubular member shaped to receive the outer manifold (762). The outer manifold (762), die insert (768), and the inner manifold (760) are each flange shaped members stacked and concentrically received within the shell (758). While an inner manifold (760) and an outer manifold (762) are depicted, one or more inner and/or outer manifolds or other devices capable of providing flow channels for forming layers of the polymeric matrix may be provided.

The die insert (768) is positioned between the outer manifold (762) and the inner manifold (760). The inner manifold (760) has the cone (764) at an end thereof extending through the die insert (768) and the outer manifold (762) and into the shell (758). The die assembly (711) may be provided with connectors, such as bolts (not shown), to connect portions of the die assembly (711).

Figure 7A:
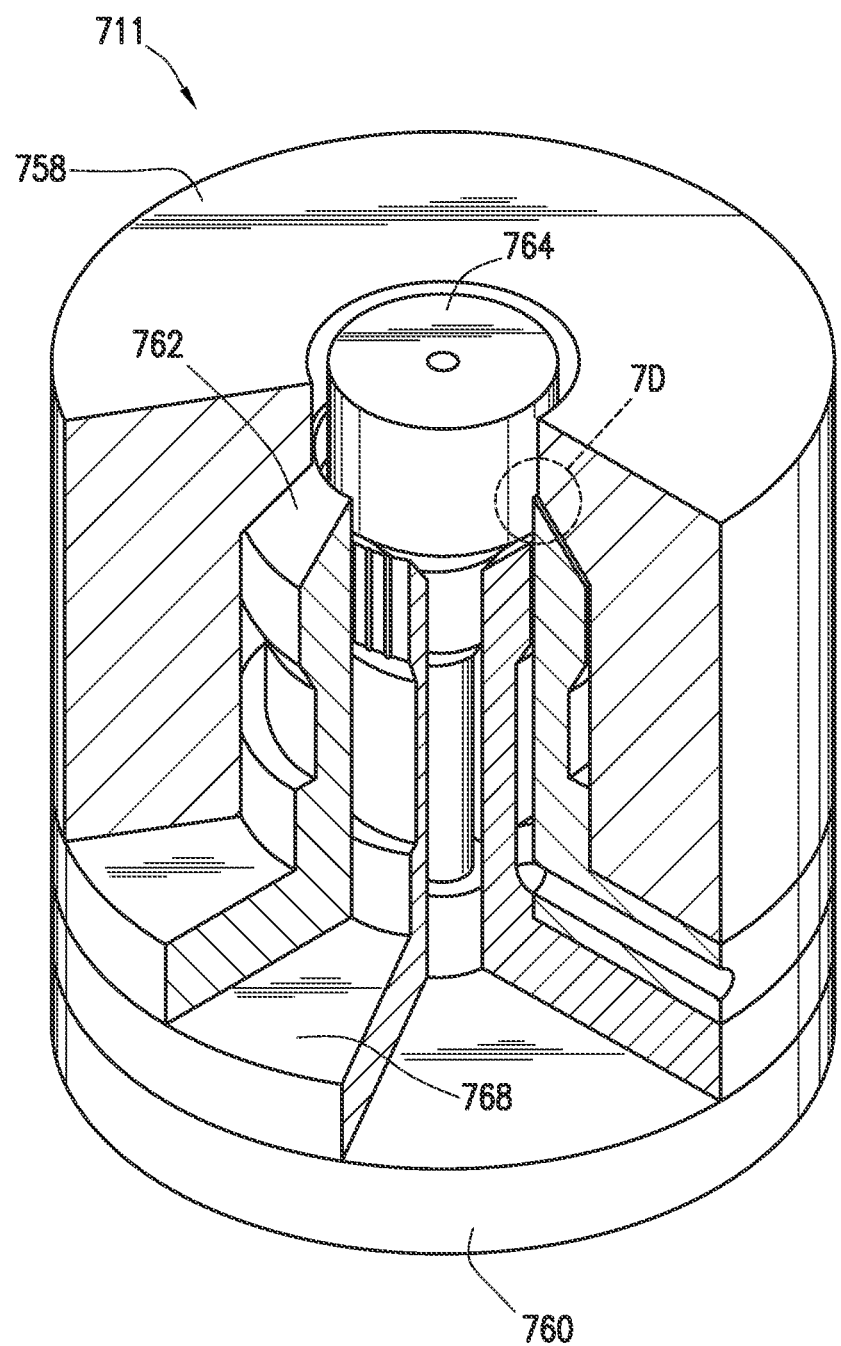
FIGS. 7A-7D are partial cross-sectional, longitudinal cross-sectional, end, and detailed cross-sectional views, respectively, of an annular die assembly in an asymmetric flow configuration.
Figure 7B:
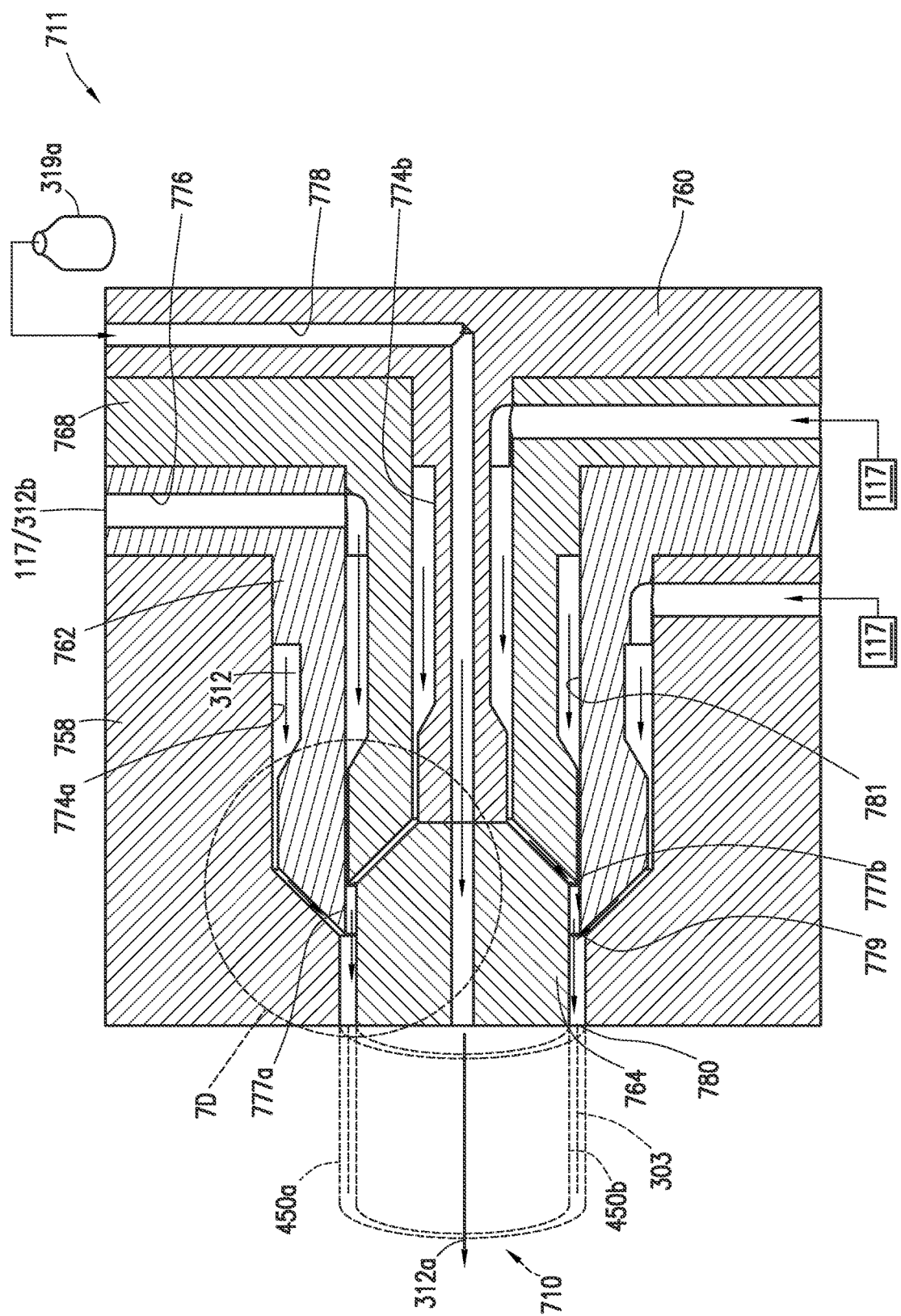
Figure 7C:
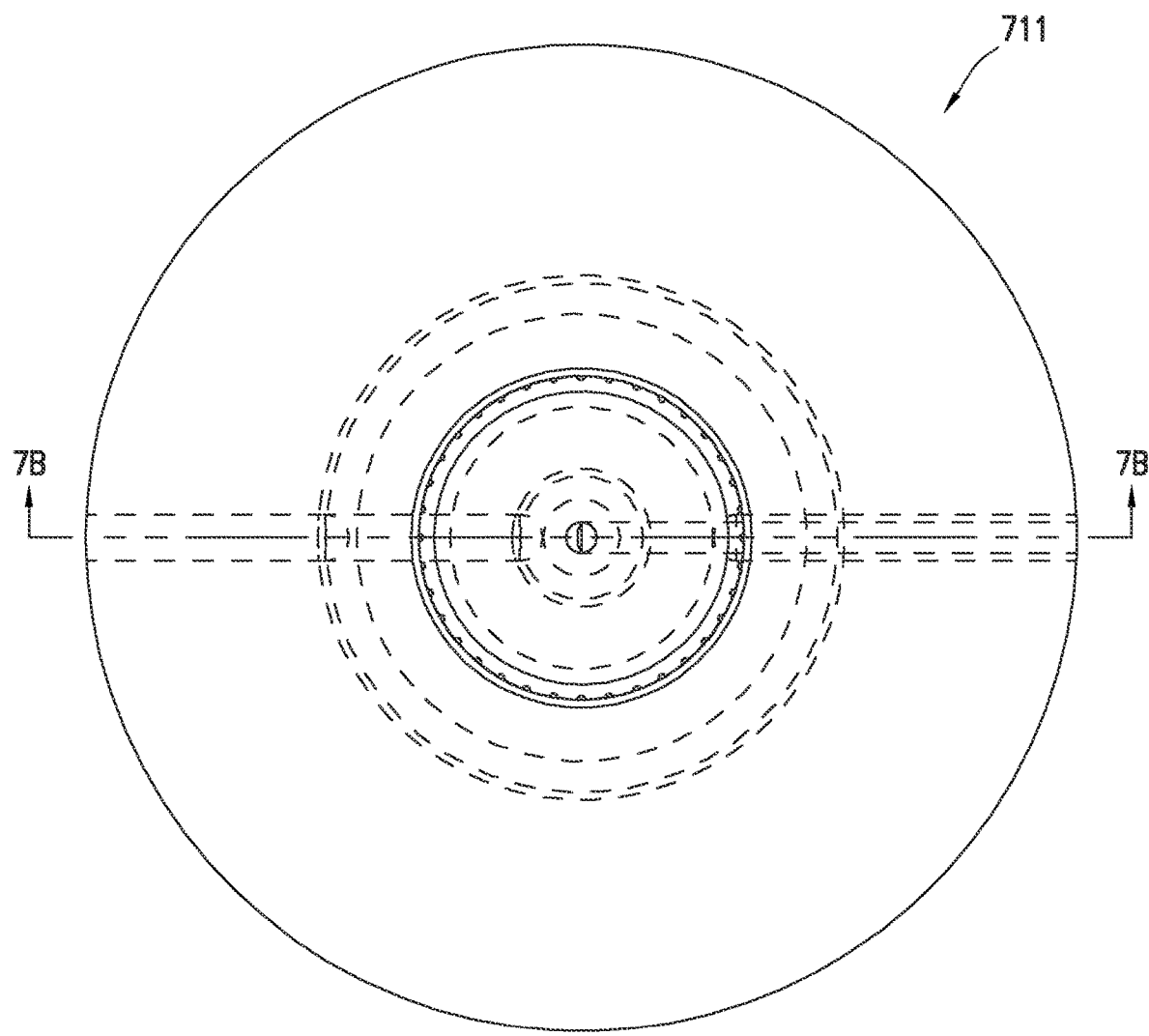

Referring now to FIG. 7B, annular matrix channels (774a, b) are defined between the shell (758) and the outer manifold (762) and between the die insert (768) and the inner manifold (760), respectively. The thermoplastic material (117) is depicted passing through the matrix channels (774a,b) as indicated by the arrows to form the layers (450a,b) of the multi-layer, annular microcapillary product (710). The multi-layer, annular microcapillary product (710) may be any of the multi-layer, annular microcapillary products described herein, such as (310a,b).

A microcapillary channel (776) is also defined between the die insert (768) and the outer manifold (762). The microcapillary channel (776) may be coupled to the microcapillary material source for passing the microcapillary material (117,312b) through the die assembly (711) and between the layers (450a,b) to form the microcapillaries (303) therein. The fluid channel (778) extends through the inner manifold (760) and the cone (764). Annular fluid (312a) from fluid source (319a) flows through the fluid channel (778) and into the product (710a,).

The die insert (768) may be positioned concentrically between the inner manifold (760) and the outer manifold (762) to provide uniform distribution of polymer melt flow through the die assembly (711). The die insert (762) may be provided with a distribution channel (781) along an outer surface thereof to facilitate the flow of the microcapillary material (117/312b) therethrough.

Figure 7D:
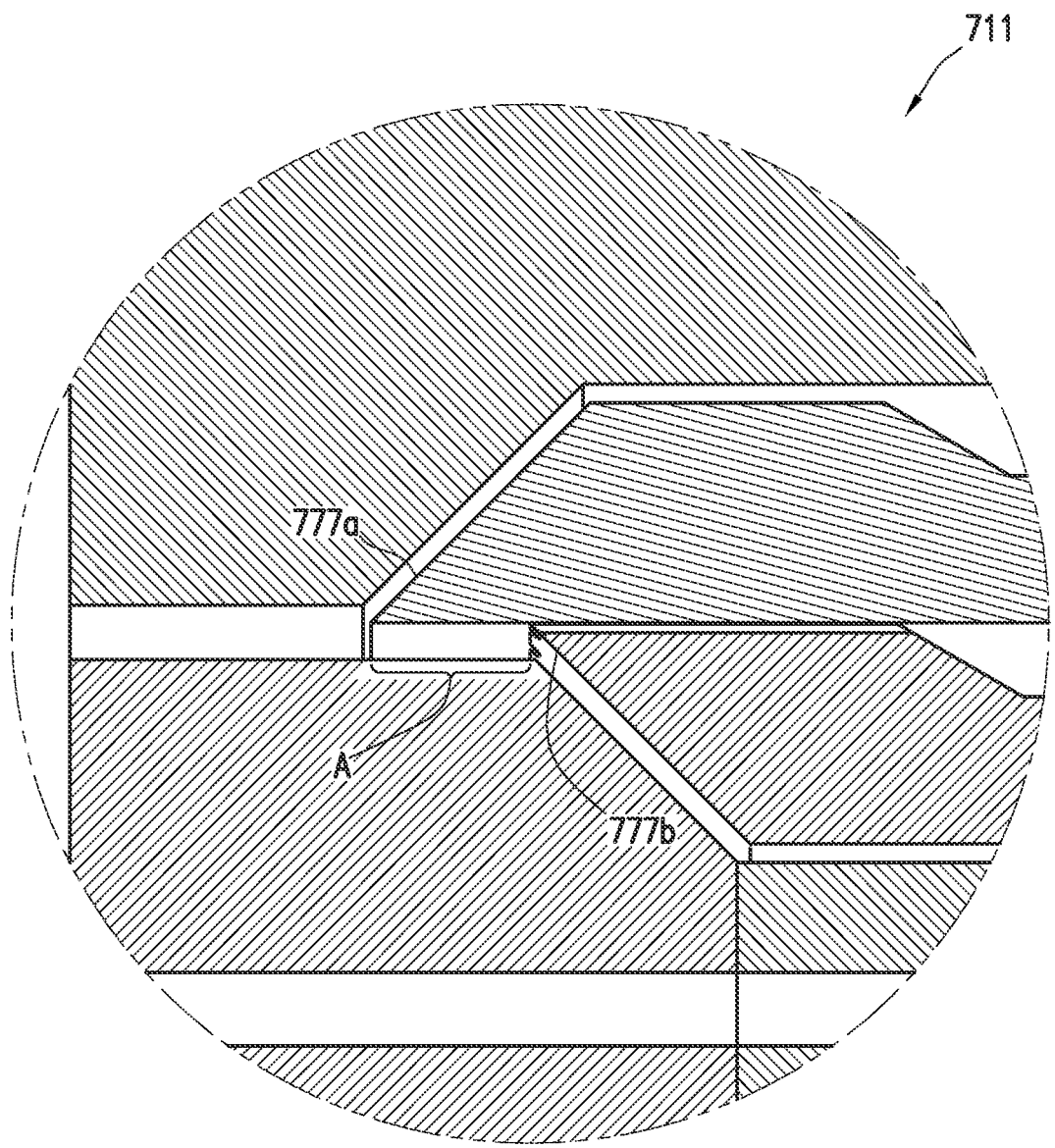
Figure 8A:
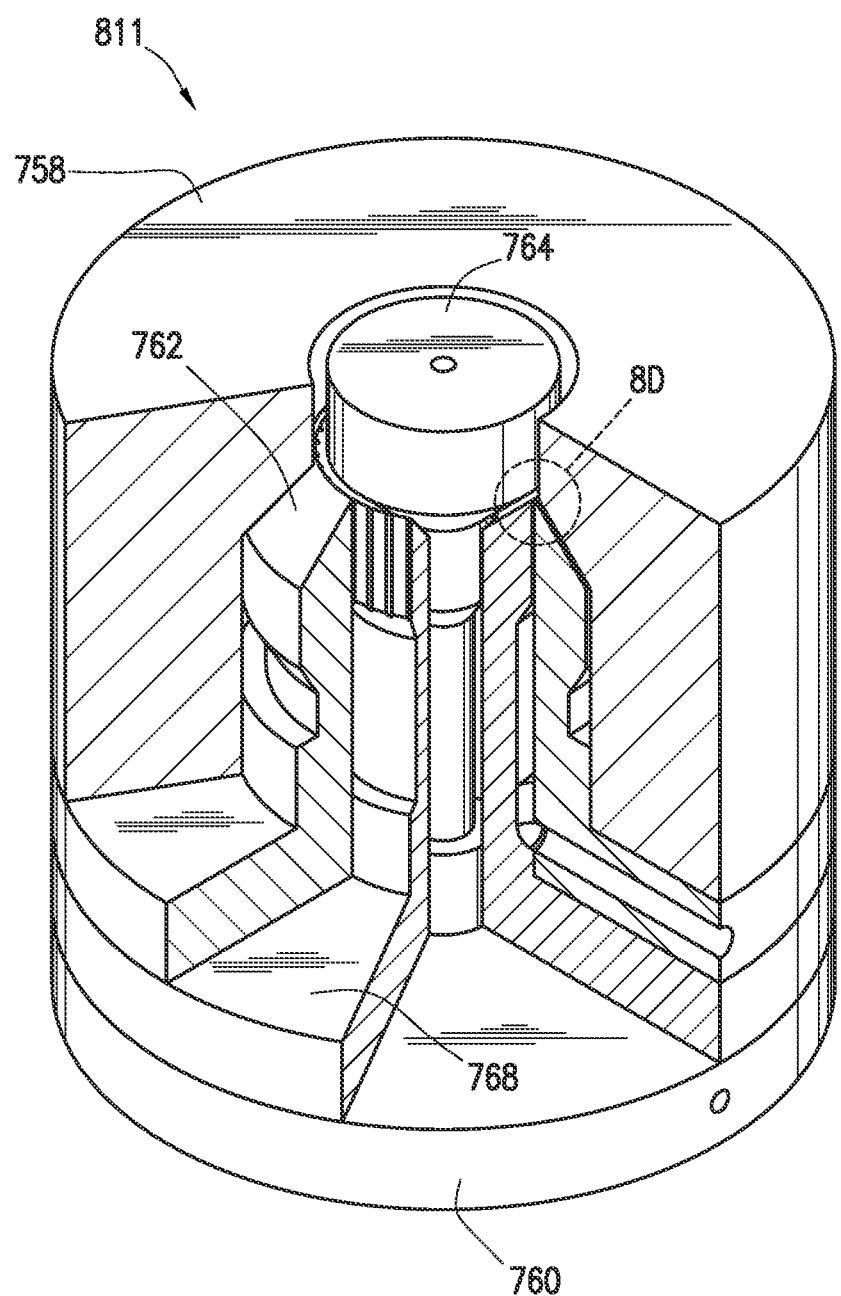
FIGS. 8A-8D are partial cross-sectional, longitudinal cross-sectional, end, and detailed cross-sectional views, respectively, of an annular die assembly in a symmetric flow configuration.
Figure 8B:
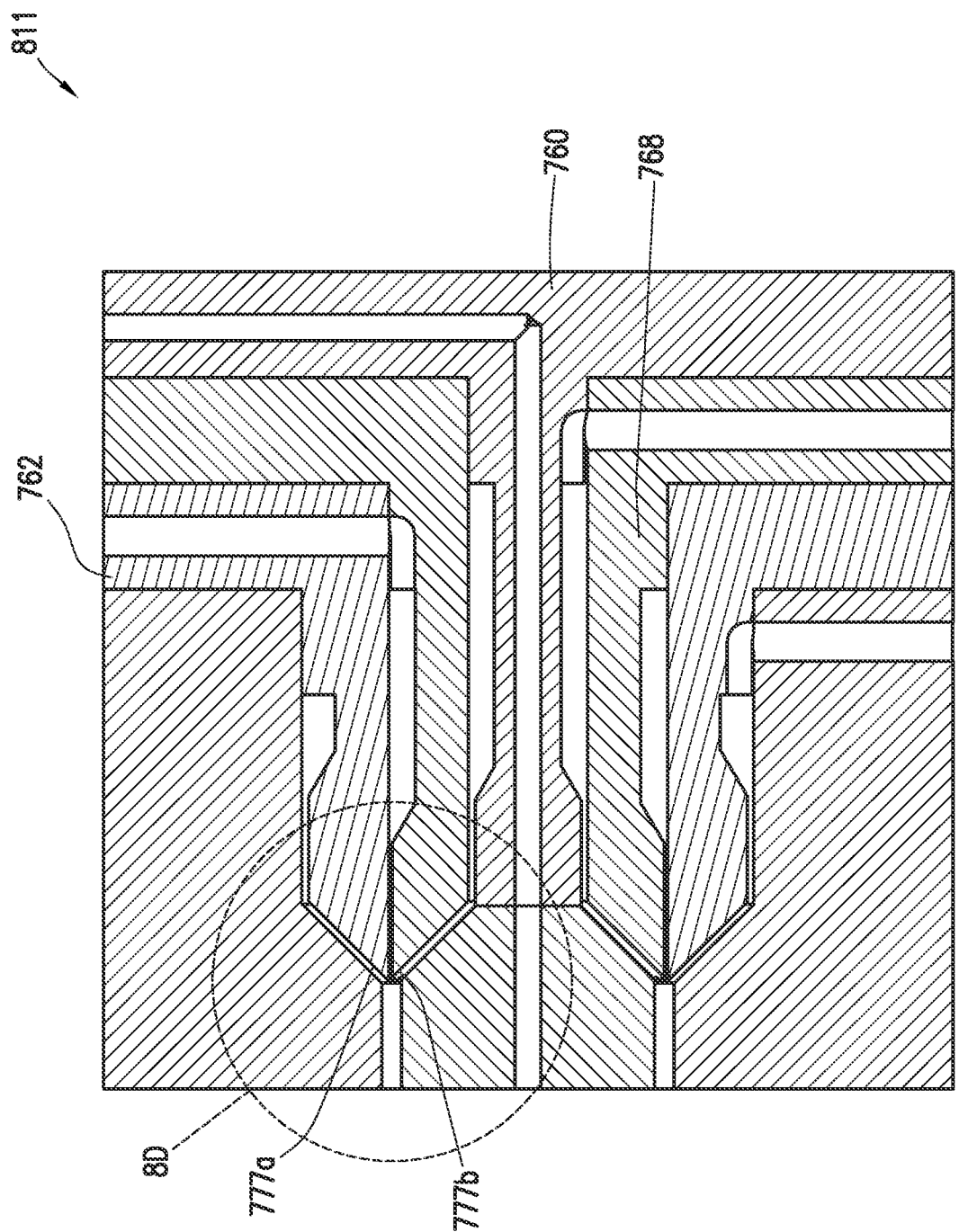
Figure 8C:
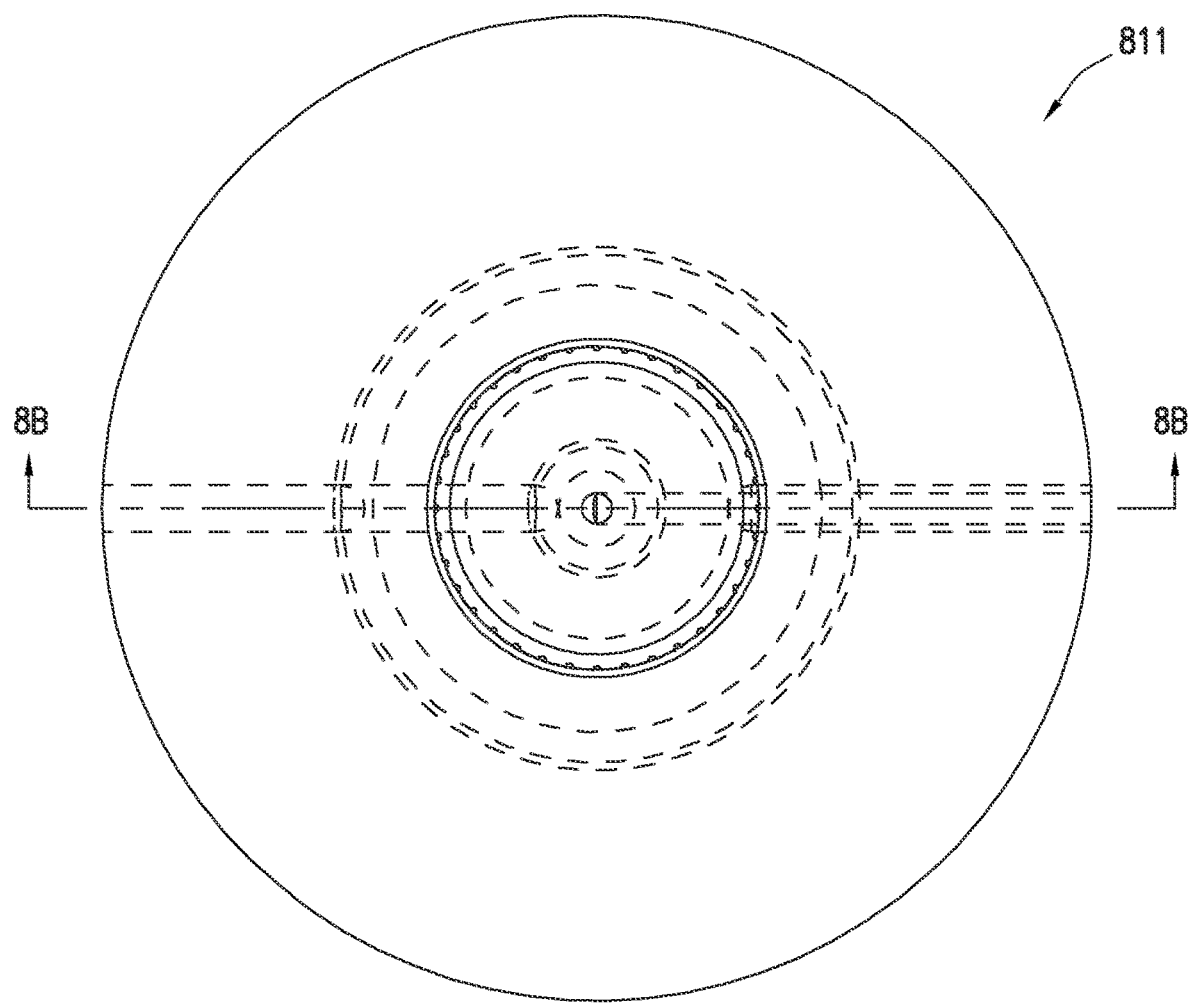
Figure 8D:
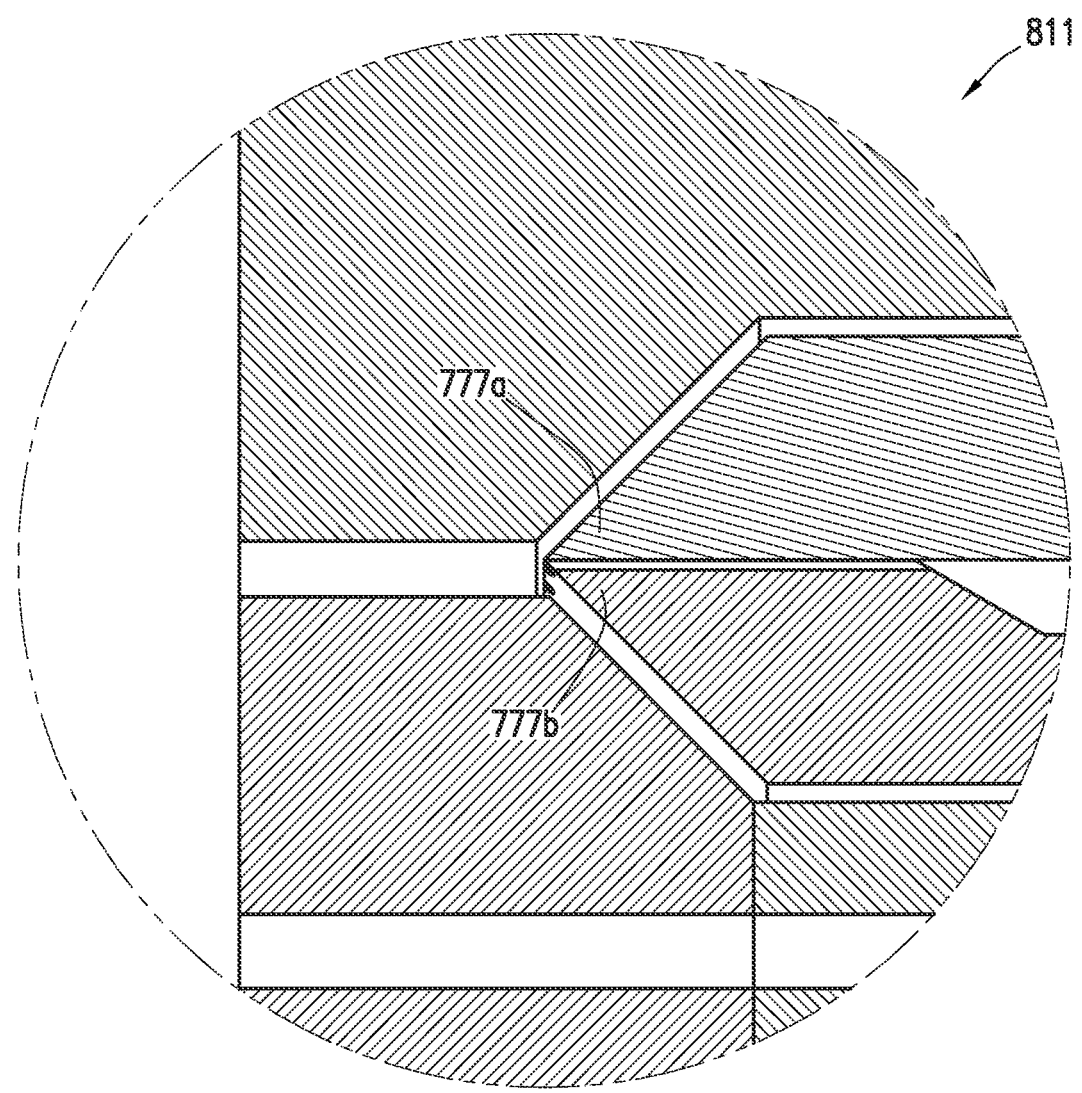

The matrix channels (774a,b) and the microcapillary channel (776) converge at convergence (779) and pass through an extrusion outlet (780) such that thermoplastic material flowing through matrix channels (774a,b) forms layers (450a,b) with microcapillary material (117/312b) from microcapillary channel (776) therebetween. The outer manifold (762) and die insert (768) each terminate at an outer nose (777a) and an insert nose (777b), respectively. As shown in FIG. 7D, the outer nose (777a) extends a distance A further toward the extrusion outlet (780) and/or a distance A further away from the extrusion outlet (780) than the nose (777b).

The die assemblies (811, 911) of FIGS. 8A-9D may be similar to the die assembly (711) of FIGS. 7A-7D, except that a position of noses (777a,b, 977a,b) of the die insert (768, 968) relative to the outer manifold (762) may be varied. The position of the noses may be adjusted to define a flow pattern, such as asymmetric or symmetric therethrough. As shown in FIGS. 7A-7D, the die assembly (711) is in an asymmetric flow configuration with nose (777b) of the die insert (768) positioned a distance A from the nose (777a) of the outer manifold (762). As shown in FIGS. 8A-8D, the die assembly (811) is in the symmetric flow configuration with the noses (777a,b) of the die insert (768) and the outer manifold (762) being flush.

FIGS. 9A-9D and 10 depict an annular die insert (968) provided with features to facilitate the creation of the channels (320), microcapillaries (303), and/or insertion of the microcapillary material (117/312b) therein (see, e.g., FIGS. 4A-4B). The die insert (968) includes a base (982), a tubular manifold (984), and a tip (986). The base (982) is a ring shaped member that forms a flange extending from a support end of the annular microcapillary manifold (984). The base (982) is supportable between the inner manifold (760) and outer manifold (762). The outer manifold (762) has an extended nose (977a) and the die insert (968) has an extended nose (977b) positioned flush to each other to define a symmetric flow configuration through the die assembly (911).

The tip (986) is an annular member at a flow end of the tubular manifold (984). An inner surface of the tip (986) is inclined and shaped to receive an end of the cone (764). The tip (986) has a larger outer diameter than the annular microcapillary manifold (984) with an inclined shoulder (990) defined therebetween. An outer surface of the tip (986) has a plurality of linear, parallel microcapillary flow channels (992) therein for the passage of the microcapillary material (117/312b) therethrough. The outer manifold 762 terminates in a sharp edge (983a) along nose (977a) and tip (986) terminates in a sharp edge (983b) along nose (977b).

The annular microcapillary manifold (984) is an annular member extending between the base (982) and the tip (986). The annular microcapillary manifold (984) is supportable between a tubular portion of the inner manifold (760) and the outer manifold (762). The annular microcapillary manifold (984) has a passage (988) therethrough to receive the inner manifold (760).

Figure 9A:
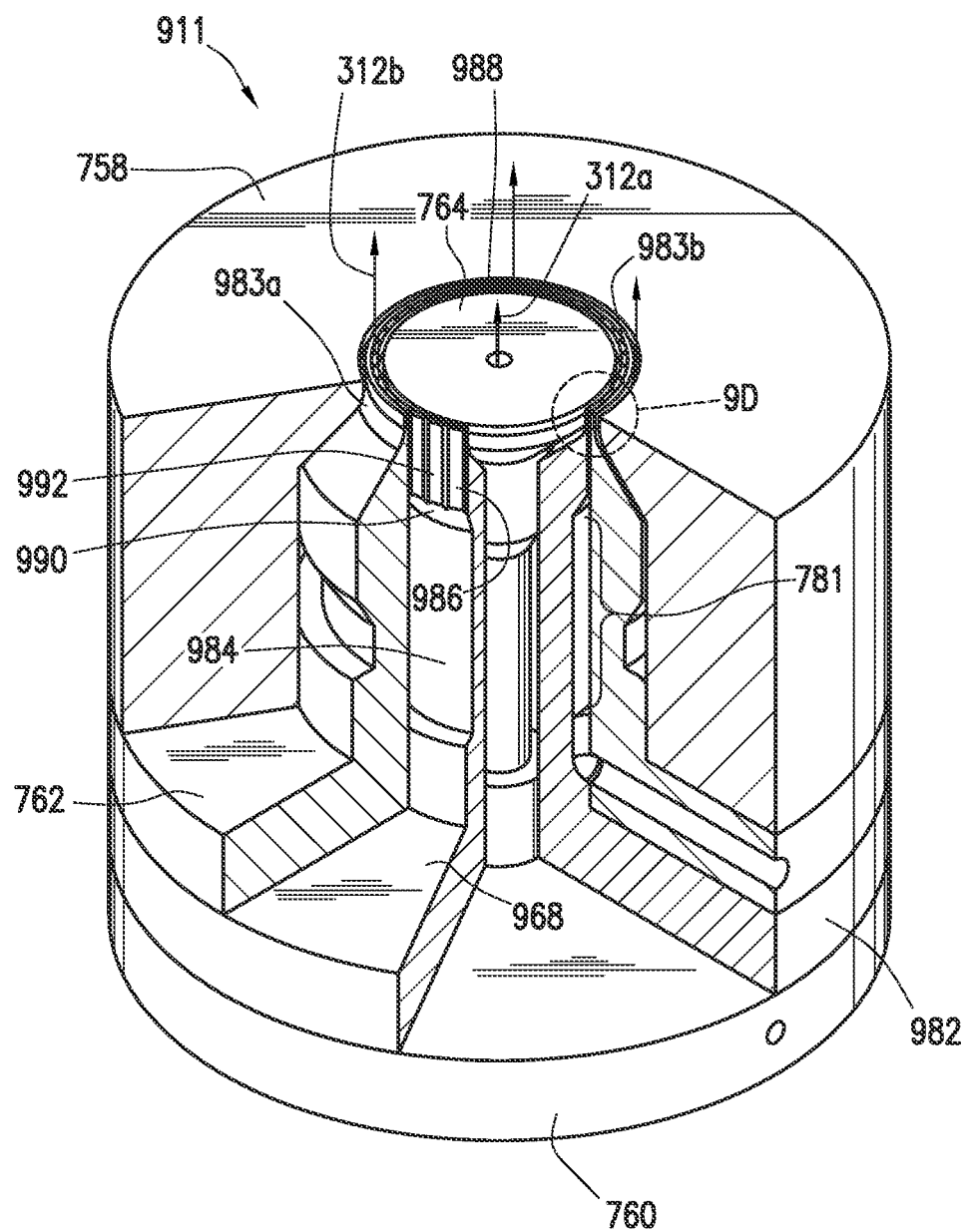
Figure 9C:
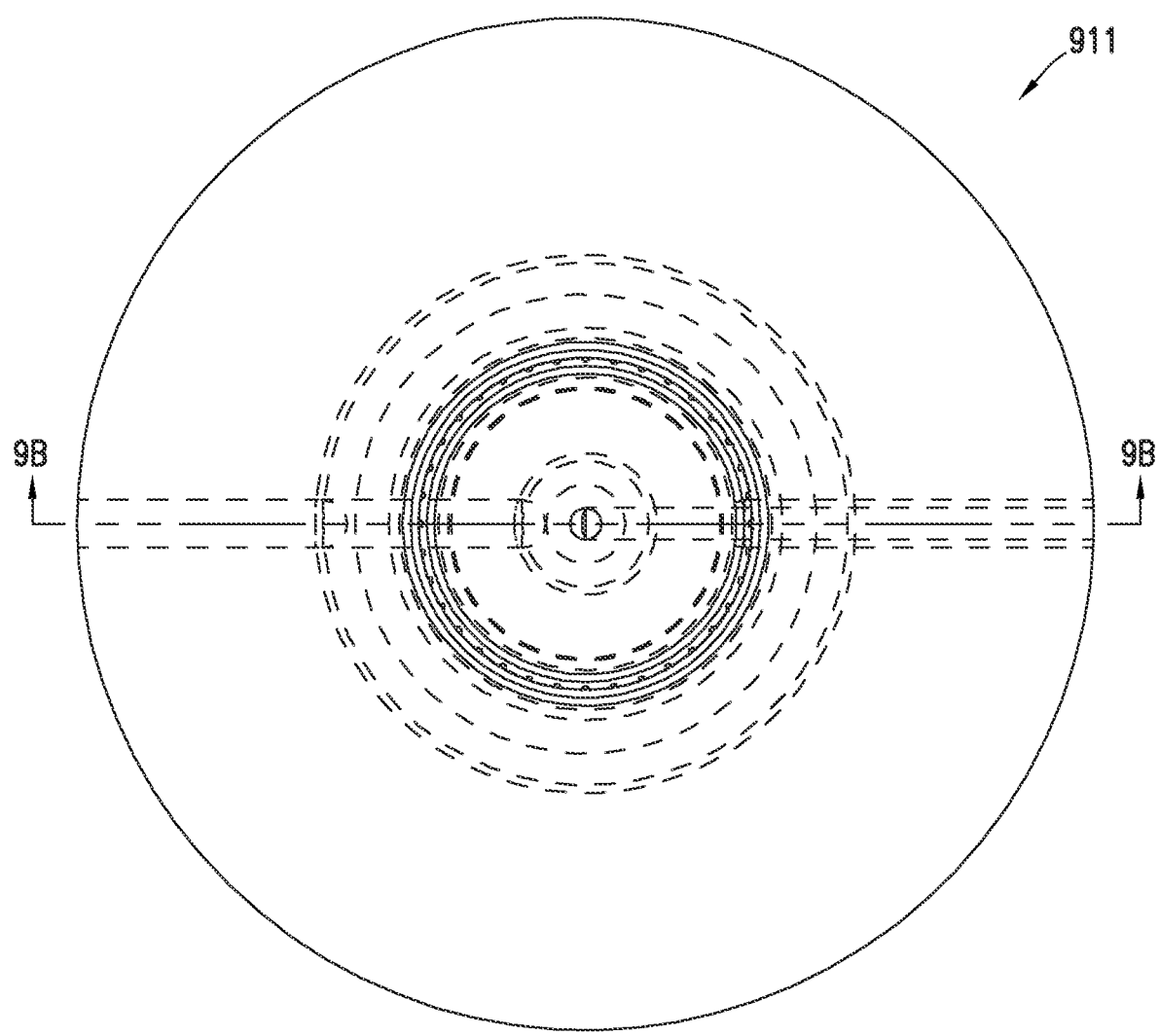
Figure 9D:
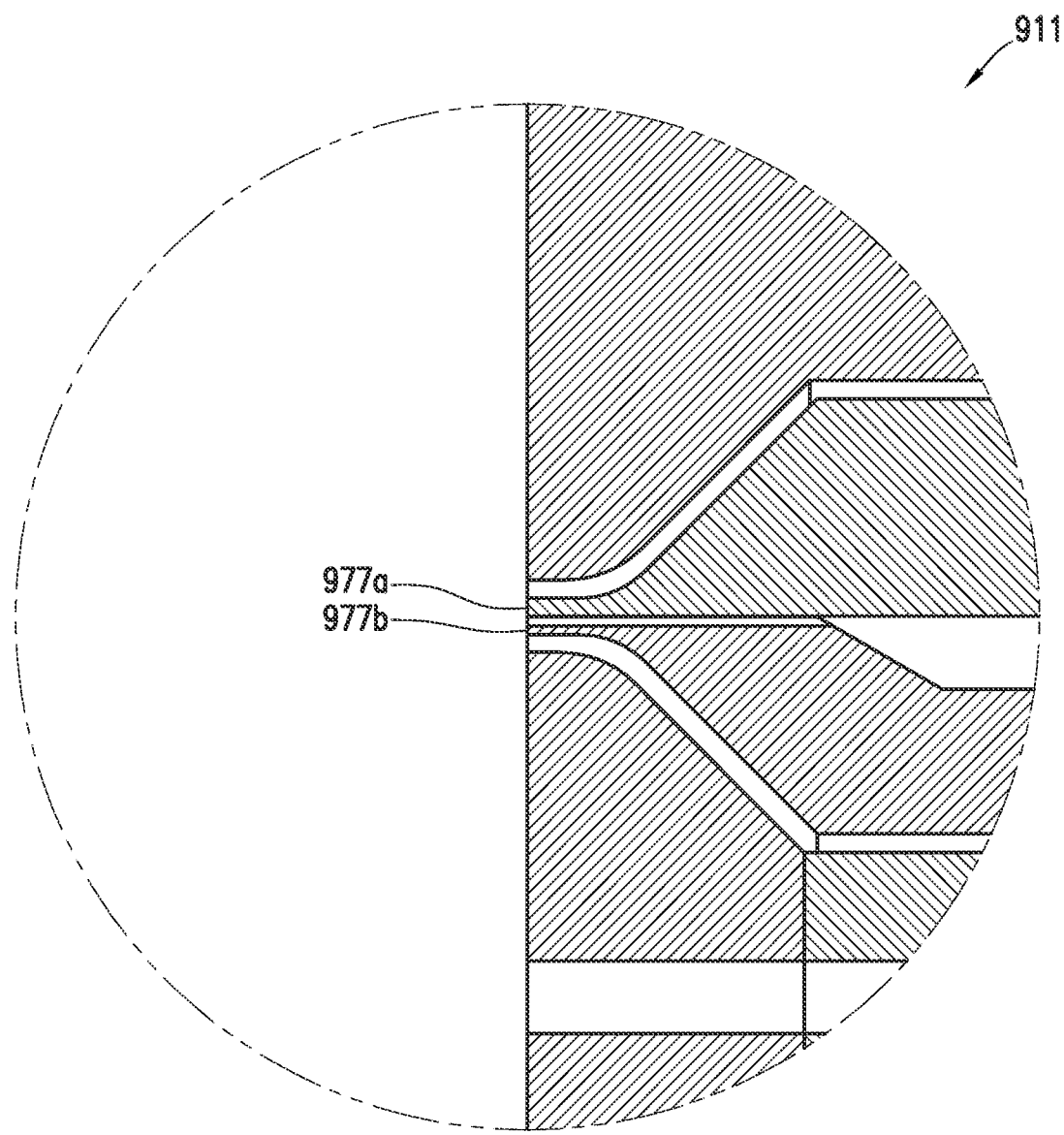
Figure 10:
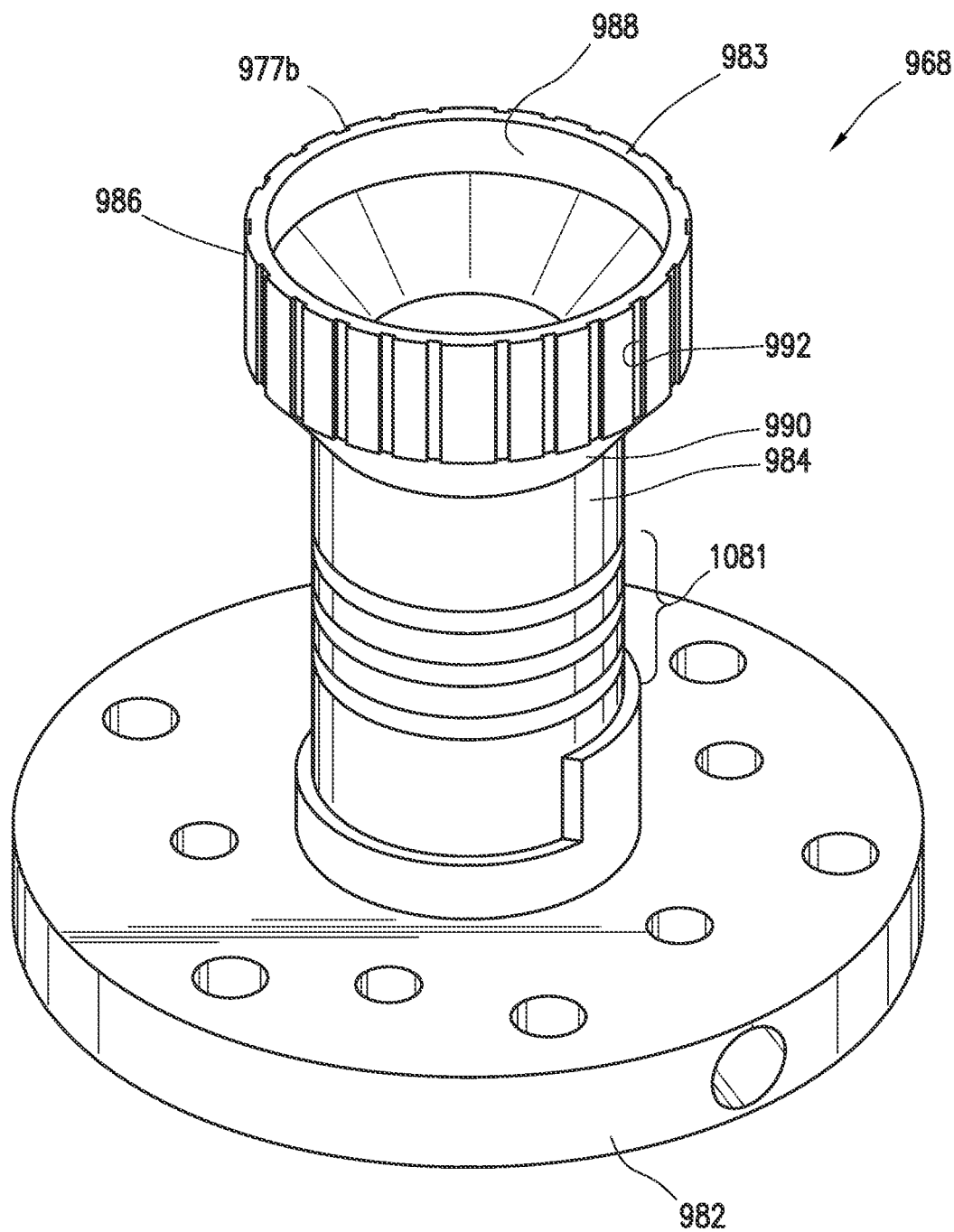
FIG. 10 is a perspective view of a die insert for an annular die assembly.

The distribution channel (781) may have a variety of configurations. As shown in FIGS. 9A-9D, an outer surface of the annular microcapillary manifold (984) has the distribution channel (781) therealong for the passage of material therethrough. The distribution channel (781) may be in fluid communication with the microcapillary material (117/312b) via the microcapillary channel (776) as schematically depicted in FIG. 9B. The distribution channel (781) may be positioned about the die insert (968) to direct the microcapillary material around a circumference of the die insert (968). The die insert (968) and/or distribution channel (781) may be configured to facilitate a desired amount of flow of microcapillary material (117/312b) through the die assembly. The distribution channel (781) defines a material flow path for the passage of the microcapillary material between the die insert (968) and the outer manifold (762). A small gap may be formed between the die insert (968) and the outer manifold (762) that allows the microcapillary material (117/312b) to leak out of the distribution channel (781) to distribute the microcapillary material (117/312b) uniformly through the die assembly (911). The distribution channel (781) may be in the form of a cavity or channel extending a desired depth into the die insert (968) and/or the outer manifold (760). For example, as shown in FIGS. 7A-9D, the distribution channel (781) may be a space defined between the outer surface of the die insert (968) and the outer manifold (760). As shown in FIG. 10, the distribution channel (781, 1081) is a helical groove extending a distance along the outer surface of the tubular manifold (984). Part or all of the distribution channel (781, 1081) may be linear, curved, spiral, cross-head, and/or combinations thereof.

Coated Conductor

The above-described annular microcapillary products can be used to prepare coated conductors, such as a cable. "Cable" and "power cable" mean at least one conductor within a sheath, e.g., an insulation covering and/or a protective outer jacket. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic. "Wire" means a single strand of conductive metal, e.g., copper or aluminum, or a single strand of optical fiber. Typically, a cable is two or more wires or optical fibers bound together, often in a common insulation covering and/or protective jacket. The individual wires or fibers inside the sheath may be bare, covered or insulated. Combination cables may contain both electrical wires and optical fibers. When the cable is a power cable, the cable can be designed for low, medium, and/or high voltage applications. Typical cable designs are illustrated in U.S. Pat. Nos. 5,246,783, 6,496,629 and 6,714,707. When the cable is a telecommunication cable, the cable can be designed for telephone, local area network (LAN)/data, coaxial CATV, coaxial RF cable or a fiber optic cable.

The above-described annular microcapillary products can constitute at least one polymeric coating layer in a cable, which is elongated in the same direction of elongation as the conductor or conductive core of the cable. As such, the polymeric coating can surround at least a portion of the conductor. In surrounding the conductor, the polymeric coating can be either in direct contact with the conductor or can be in indirect contact with the conductor by being placed on one or more interceding layers between the conductor and the polymeric coating. The polymeric coating comprises a polymeric matrix material and a plurality of microcapillaries which extend substantially in the direction of elongation of the polymeric coating. In various embodiments, the microcapillaries can be radially placed around the polymeric coating. Additionally, the microcapillaries can be spaced apart equidistantly or substantially equidistantly relative to one another.

One or more of the above-described die assemblies for producing annular microcapillary products can be modified to permit a conductor to pass therethrough, thereby allowing the polymeric coating comprising a polymeric matrix material and a plurality of microcapillaries to be coextruded onto the conductor or an interceding layer. Such a configuration is commonly known in the art as a crosshead die (see, e.g., US 2008/0193755 A1, US 2014/0072728 A1, and US 2013/0264092 A1). Specifically, the inner manifold (760) and cone (764) in FIGS. 7A, 8A and 9A can be modified to create a wire- or conductor-passing hole. As one of ordinary skill in the art would recognize, all the parts close to the die exit can be modified such that the multilayer extrusion materials are able to coat onto a conductor or interceding layer, traveling through the wire- or conductor-passing hole. An additional part with molding passage can be fabricated. Such modifications are within the capabilities of one having ordinary skill in the art.

In an exemplary microcapillary extrusion coating process, a conductor core through an extrusion coating equipment can be pulled by a retractor to continuously move through the wire-passing hole of the inner manifold (760) to go through the projection end and then pass through the molding passage of the outer die. While the conductor core is moving, the polymer melt is injected by pressure into the material-supplying passages, flows toward to the wiring coating passage, and then into the molding passage at the outlet to coat onto the outer surface of the conductor core which is passing through the molding passage. Subsequently, the coated conductor core continues to move through the molding passage to outside the die, and then it can be cooled and hardened.

In preparing the polymeric coating, any of the above-described polymers can be used as the polymeric matrix material. In various embodiments, the polymer employed as the polymeric matrix material can comprise an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based polymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a C3-20 (i.e., having 3 to 20 carbon atoms) linear, branched or cyclic α-olefin. Examples of C3-20 α-olefins include propene, 1 butene, 4-methyl-1-pentene, 1-hexene, 1-octene, 1-decene, 1 dodecene, 1 tetradecene, 1 hexadecene, and 1-octadecene. The α-olefins can also have a cyclic structure such as cyclohexane or cyclopentane, resulting in an α-olefin such as 3 cyclohexyl-1-propene (allyl cyclohexane) and vinyl cyclohexane. Illustrative ethylene/α-olefin interpolymers include ethylene/propylene, ethylene/1-butene, ethylene/1 hexene, ethylene/1 octene, ethylene/propylene/1-octene, ethylene/propylene/1-butene, and ethylene/1-butene/1 octene.

Ethylene-based polymers also include interpolymers of ethylene with one or more unsaturated acid or ester monomers, such as unsaturated carboxylic acids or alkyl (alkyl) acrylates. Such monomers include, but are not limited to, vinyl acetate, methyl acrylate, methyl methacrylate, ethyl acrylate, ethyl methacrylate, butyl acrylate, acrylic acid, and the like. Accordingly, ethylene-based polymers can include interpolymers such as poly(ethylene-co-methyl acrylate) ("EMA"), poly(ethylene-co-ethyl acrylate) ("EEA"), poly(ethylene-co-butyl acrylate) ("EBA"), and poly(ethylene-co-vinyl acetate) ("EVA").

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In an embodiment, the ethylene-based polymer can be a low-density polyethylene ("LDPE"). LDPEs are generally highly branched ethylene homopolymers, and can be prepared via high pressure processes (i.e., HP-LDPE). LDPEs suitable for use herein can have a density ranging from 0.91 to 0.94 g/cm3. In various embodiments, the ethylene-based polymer is a high-pressure LDPE having a density of at least 0.915 g/cm$^3$, but less than 0.94 g/cm$^3$, or in the range of from 0.924 to 0.938 g/cm$^3$. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an I2 of 2 g/10 min. Melt indices provided herein are determined according to ASTM method D1238. Unless otherwise noted, melt indices are determined at 190° C. and 2.16 Kg (i.e., I2). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be a linear-low-density polyethylene ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm$^3$. LLDPEs suitable for use herein can have a melt index ($I_2$) ranging from 1 to 20 g/10 min., or from 3 to 8 g/10 min.

In an embodiment, the ethylene-based polymer can be a very-low-density polyethylene ("VLDPE"). VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index ($I_2$) ranging from 0.1 to 20 g/10 min., or from 0.3 to 5 g/10 min.

In an embodiment, the ethylene-based polymer can be a medium-density polyethylene ("MDPE"). MDPEs are ethylene-based polymers having densities generally ranging from 0.926 to 0.950 g/cm$^3$. In various embodiments, the MDPE can have a density ranging from 0.930 to 0.949 g/cm$^3$, from 0.940 to 0.949 g/cm$^3$, or from 0.943 to 0.946 g/cm$^3$. The MDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min, as determined according to ASTM D-1238 (190° C./2.16 kg).

In an embodiment, the ethylene-based polymer can be a high-density polyethylene ("HDPE"). HDPEs are ethylene-based polymers generally having densities greater than 0.940 g/cm$^3$. In an embodiment, the HDPE has a density from 0.945 to 0.97 g/cm$^3$, as determined according to ASTM D-792. The HDPE can have a peak melting temperature of at least 130° C., or from 132 to 134° C. The HDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min, or 0.5 g/10 min, as determined according to ASTM D-1238 (190° C./2.16 kg). Also, the HDPE can have a PDI in the range of from 1.0 to 30.0, or in the range of from 2.0 to 15.0, as determined by gel permeation chromatography.

In an embodiment, the ethylene-based polymer can comprise a combination of any two or more of the above-described ethylene-based polymers.

In an embodiment, the polymeric matrix material can comprise LDPE. In an embodiment, the polymeric matrix material is LDPE.

In an embodiment, the polymeric matrix material can comprise MDPE. In an embodiment, the polymeric matrix material is MDPE.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from 10-12:1 to 10 1:1, or from 10-9:1 to 10-5:1.

Examples of suitable commercially available ethylene-based polymers include, but are not limited to AXELERON™ GP C-0588 BK (LDPE), AXELERON™ FO 6548 BK (MDPE), AXELERON™ GP A-7530 NT (LLDPE), AXELERON™ GP G-6059 BK (LLDPE), AXELERON™ GP K-3479 BK (HDPE), AXELERON™ GP A-1310 NT (HDPE), and AXELERON™ FO B-6549 NT (MDPE), all of which are commercially available from The Dow Chemical Company, Midland, Mich., USA.

Polypropylene-based polymers, such as homopolymer, random copolymer, heterophasic copolymer, and high-crystalline homopolymer polypropylenes are commercially available from Braskem Corp.

In preparing the polymeric coating, any of the above-described materials can be used as the microcapillary material.

In various embodiments, the microcapillary material is a gas. In one or more embodiments, the microcapillary material is air. In such embodiments, the microcapillaries define individual, discrete void spaces which are completely surrounded by the polymeric matrix material when viewed as a cross-section taken orthogonal to the direction of elongation of the microcapillaries. When the microcapillary material is a gas (e.g., air), the aggregate of void spaces defined by the microcapillaries can constitute at least 10, at least 20, or at least 30 volume percent ("vol %") of the total volume of the polymeric coating. In various embodiments, the aggregate of void spaces defined by the microcapillaries can constitute in the range of from 10 to 90 vol %, from 20 to 70 vol %, or from 30 to 60 vol % of the total volume of the polymeric coating.

In one or more embodiments, the microcapillary material can be an elastomeric microcapillary material. As known in the art, elastomers are defined as materials which experience large reversible deformations under relatively low stress. In any embodiments where the microcapillaries are filled with a polymeric microcapillary material, the microcapillaries can define individual, discrete polymer-filled segments which are completely surrounded by the polymeric matrix material when viewed as a cross-section taken orthogonal to the direction of elongation of the microcapillaries.

In various embodiments, the elastomer can be an olefin elastomer. Olefin elastomers include both polyolefin homopolymers and interpolymers. Examples of the polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

Olefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of the olefin elastomers useful in this invention include very-low-density polyethylene ("VLDPE") (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), and homogeneously branched, substantially linear ethylene/α-olefin polymers (e.g., AFFINITY™ and ENGAGE™ polyethylene available from The Dow Chemical Company).

The olefin elastomers useful herein also include propylene, butene, and other alkene-based copolymers, e.g., copolymers comprising a majority of units derived from propylene and a minority of units derived from another α-olefin (including ethylene). Exemplary propylene polymers useful herein include VERSIFY™ polymers available from The Dow Chemical Company, and VISTAMAXX™ polymers available from ExxonMobil Chemical Company.

Olefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

Olefin elastomers, particularly ethylene elastomers, can have a density of less than 0.91 g/cm³ or less than 0.90 g/cm³. Ethylene copolymers typically have a density greater than 0.85 g/cm³ or greater than 0.86, g/cm³.

Ethylene elastomers can have a melt index ($I_2$) greater than 0.10 g/10 min., or greater than 1 g/10 min. Ethylene elastomers can have a melt index of less than 500 g/10 min. or less than 100 g/10 min.

Other suitable olefin elastomers include olefin block copolymers (such as those commercially available under the trade name INFUSE™ from The Dow Chemical Company, Midland, Mich., USA), mesophase-separated olefin multi-block interpolymers (such as described in U.S. Pat. No. 7,947,793), and olefin block composites (such as described in U.S. Patent Application Publication No. 2008/0269412, published on Oct. 30, 2008).

In various embodiments, the elastomer useful as the microcapillary material can be a non-olefin elastomer. Non-olefin elastomers useful herein include silicone and urethane elastomers, styrene-butadiene rubber ("SBR"), nitrile rubber, chloroprene, fluoroelastomers, perfluoroelastomers, polyether block amides and chlorosulfonated polyethylene. Silicone elastomers are polyorganosiloxanes typically having an average unit formula $R_aSiO_{(4-a)/2}$ which may have a linear or partially-branched structure, but is preferably linear. Each R may be the same or different. R is a substituted or non-substituted monovalent hydrocarbyl group which may be, for example, an alkyl group, such as methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be terminated by any of the above groups or with hydroxyl groups. When R is an alkenyl group the alkenyl group is preferably a vinyl group or hexenyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

Urethane elastomers are prepared from reactive polymers such as polyethers and polyesters and isocyanate functional organic compounds. One typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates. The urethane elastomers are commercially prepared having various ratios of isocyanate compounds and polyethers or polyesters.

The most common urethane elastomers are those containing hydroxyl functional polyethers or polyesters and low molecular weight polyfunctional, polymeric isocyanates. Another common material for use with hydroxyl functional polyethers and polyesters is toluene diisocyanate.

Nonlimiting examples of suitable urethane rubbers include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers. Preferred urethane rubbers are those so-called "millable" urethanes such as MILLATHANE™ grades from TSI Industries.

Additional information on such urethane materials can be found in Golding, Polymers and Resins, Van Nostrande, 1959, pages 325 et seq. and Saunders and Frisch, Polyurethanes, Chemistry and Technology, Part II, Interscience Publishers, 1964, among others.

Suitable commercially available elastomers for use as the microcapillary material include, but are not limited to, ENGAGE™ polyolefin elastomers available from The Dow Chemical Company, Midland, Mich., USA. A specific example of such an elastomer is ENGAGE™ 8200, which is an ethylene/octene copolymer having a melt index ($I_2$) of 5.0 and a density of 0.870 g/cm³.

In embodiments where an elastomer microcapillary material is employed, it may be desirable for the matrix material to have higher toughness, abrasion resistance, density, and/ or flexural modulus relative to the elastomer. This combination affords a polymeric coating having a tough outer layer but with increased flexibility compared to a coating formed completely of the same matrix material. For example, in various embodiments, the polymeric coating can have one or more of the above-described elastomers as the microcapillary material with an ethylene-based polymer, a polyamide (e.g., nylon 6), polybutylene terephthalate ("PBT"), polyethylene terephthalate ("PET"), a polycarbonate, or combinations of two or more thereof as the polymeric matrix material. In various embodiments, the polymeric coating can comprise an olefin elastomer as the microcapillary material and the polymeric matrix material can be selected from the group consisting of HDPE, MDPE, LLDPE, LDPE, a polyamide, PBT, PET, a polycarbonate, or combinations of two or more thereof. In one or more embodiments, the microcapillary material can comprise an ethylene/octene copolymer olefin elastomer and the polymeric matrix material can comprise MDPE.

The above-described polymeric matrix material, microcapillary material, or both can contain one or more additives, such as those typically used in preparing cable coatings. For example, the polymeric matrix material, microcapillary material, or both can optionally contain a non-conductive carbon black commonly used in cable jackets. In various embodiments, the amount of a carbon black in the composition can be greater than zero (>0), typically from 1, more typically from 2, and up to 3 wt %, based on the total weight of the composition. In various embodiments, the composition can optionally include a conductive filler, such as a conductive carbon black, metal fibers, powders, or carbon nanotubes, at a high level for semiconductive applications.

Non-limiting examples of conventional carbon blacks include the grades described by ASTM N550, N472, N351, N110 and N660, Ketjen blacks, furnace blacks and acetylene blacks. Other non-limiting examples of suitable carbon blacks include those sold under the tradenames BLACK PEARLS®, CSX®, ELFTEX®, MOGUL®, MONARCH®, REGAL® and VULCAN®, available from Cabot.

The polymeric matrix material, microcapillary material, or both can optionally contain one or more additional additives, which are generally added in conventional amounts, either neat or as part of a masterbatch. Such additives include, but not limited to, flame retardants, processing aids, nucleating agents, foaming agents, crosslinking agents, fillers, pigments or colorants, coupling agents, antioxidants, ultraviolet stabilizers (including UV absorbers), tackifiers, scorch inhibitors, antistatic agents, plasticizers, lubricants, viscosity control agents, anti-blocking agents, surfactants, extender oils, acid scavengers, metal deactivators, vulcanizing agents, and the like.

In one or more embodiments, the polymeric matrix material, the microcapillary material, or both can be crosslinkable. Any suitable methods known in the art can be used to crosslink the matrix material and/or the microcapillary material. Such methods include, but not limited to, peroxide crosslinking, silane functionalization for moisture crosslinking, UV crosslinking, or e-beam cure. Such crosslinking methods may require the inclusion of certain additives (e.g., peroxides), as known in the art.

In various embodiments, the polymeric matrix material, the microcapillary material, or both can contain one or more adhesion modifiers. Adhesion modifiers may be helpful in improving interfacial adhesion between the matrix material and the microcapillary material. Any known or hereafter discovered additive that improves adhesion between two polymeric materials may be used herein. Specific examples of suitable adhesion modifiers include, but are not limited to, maleic anhydride ("MAH") grafted resins (e.g., MAH-grafted polyethylene, MAH-grafted ethylene vinyl acetate, MAH-grafted polypropylene), aminated polymers (e.g., amino-functionalized polyethylene), and the like, and combinations of two or more thereof. MAH-grafted resins are commercially available under the AMPLIFY™ GR trade name from The Dow Chemical Company (Midland, Mich., USA) and under the FUSABOND™ trade name from DuPont (Wilmington, Del., USA).

Non-limiting examples of flame retardants include, but are not limited to, aluminum hydroxide and magnesium hydroxide.

Non-limiting examples of processing aids include, but are not limited to, fatty amides such as stearamide, oleamide, erucamide, or N,N' ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids; polysiloxanes; and fluoroelastomers such as Viton® available from Dupon Performance Elastomers LLC, or Dynamar™ available from Dyneon LLC.

A non-limiting example of a nucleating agent include Hyperform® HPN-20E (1,2 cyclohexanedicarboxylic acid calcium salt with zinc stearate) from Milliken Chemicals, Spartanburg, S.C.

Non-limiting examples of fillers include, but are not limited to, various flame retardants, clays, precipitated silica and silicates, fumed silica, metal sulfides and sulfates such as molybdenum disulfide and barium sulfate, metal borates such as barium borate and zinc borate, metal anhydrides such as aluminum anhydride, ground minerals, and elastomeric polymers such as EPDM and EPR. If present, fillers are generally added in conventional amounts, e.g., from 5 wt % or less to 50 or more wt % based on the weight of the composition.

In various embodiments, the polymeric coating on the coated conductor can have a thickness ranging from 100 to 3,000 μm, from 500 to 3,000 μm, from 100 to 2,000 μm, from 100 to 1,000 μm, from 200 to 800 μm, from 200 to 600 μm, from 300 to 1,000 μm, from 300 to 900 μm, or from 300 to 700 μm.

Additionally, the average diameter of the microcapillaries in the polymeric coating can be at least 50 μm, at least 100 μm, or at least 250 μm. Additionally, the microcapillaries in the polymeric coating can have an average diameter in the range of from 50 to 1,990 μm, from 50 to 990 μm, from 50 to 890 μm, from 100 to 790 μm, from 150 to 690 μm, or from 250 to 590 μm. It should be noted that, despite the use of the term diameter, the cross-section of the microcapillaries need not be round. Rather, they may take a variety of shapes, such as oblong as shown in FIGS. 4B and 4C. In such instances, the "diameter" shall be defined as the longest dimension of the cross-section of the microcapillary. This dimension is illustrated as λ in FIG. 4B. The "average" diameter shall be determined by taking three random cross-sections from a polymeric coating, measuring the diameter of each microcapillary therein, and determining the average of those measurements. The diameter measurement is conducted by cutting a cross section of the extruded article and observing under an optical microscope fitted with a scale to measure the size of the micro-capillary.

In one or more embodiments, the ratio of the thickness of the polymeric coating to the average diameter of the microcapillaries can be in the range of from 2:1 to 400:1

The spacing of the microcapillaries can vary depending on the desired properties to be achieved. Additionally, the spacing of the microcapillaries can be defined relative to the diameter of the microcapillaries. For instance, in various embodiments, the microcapillaries can be spaced apart a distance of less than 1 times the average diameter of the microcapillaries, and can be as high as 10 times the average diameter of the microcapillaries. In various embodiments, the microcapillaries can be spaced apart an average of 100 to 5,000 µm, an average of 200 to 1,000 µm, or an average of 100 to 500 µm. The measurement "spaced apart" shall be determined on an edge-to-edge basis, as illustrated by "s" in FIG. 2C.

In various embodiments, when the microcapillary material is a gas at room temperature (e.g., air), the microcapillary coating can have a density that is at least 5%, at least 10%, at least 15%, at least 20%, at least 25%, or at least 30% less than an identical coating prepared from the same polymeric matrix material but not having microcapillaries. Additionally, the polymeric coating can have a density in the range of from 5 to 40%, from 10 to 35%, or from 15 to 30% less than an identical coating prepared from the same polymeric matrix material but not having microcapillaries.

In one or more embodiments, when the microcapillary material is a gas at room temperature (e.g., air), the polymeric coating can have a reduction in tensile strength of less than 50%, less than 45%, less than 40%, less than 35%, or less than 30% relative to an identical coating prepared from the same polymeric matrix material except not having microcapillaries. Additionally, the microcapillary coating can have a reduction in tensile strength in the range of from 10 to 50%, or from 20 to 45% relative to an identical coating prepared from the same polymeric matrix material except not having microcapillaries.

In various embodiments, when the microcapillary material is a gas at room temperature (e.g., air), the polymeric coating can have a reduction in elongation-at-break of less than 30%, or less than 25% relative to an identical coating prepared from the same polymeric matrix material except not having microcapillaries. Additionally, the polymeric coating can have a reduction in elongation-at-break in the range of from 5 to 30%, or from 10 to 25% relative to an identical coating prepared from the same polymeric matrix material except not having microcapillaries.

In various embodiments, when the microcapillary material is an elastomer, the polymeric coating can have higher flexibility, especially at low temperature, and reduced density because of the presence of lower density elastomer in the microcapillary.

Optical Fiber Cable

In various embodiments, an optical fiber cable can be prepared that includes at least one optical fiber transmission medium (e.g., optic fiber) and an elongated polymeric protective component (e.g., a buffer tube) surrounding at least a portion of the optical fiber transmission medium, where the polymeric protective component comprises a polymeric matrix material and a plurality of microcapillaries extending substantially in the direction of elongation of the polymeric material. At least a portion of the microcapillaries contain a polymeric microcapillary material. As explained in greater detail, below, in this embodiment, the polymeric matrix material has a higher flexural modulus than the polymeric microcapillary material.

Figure 11:
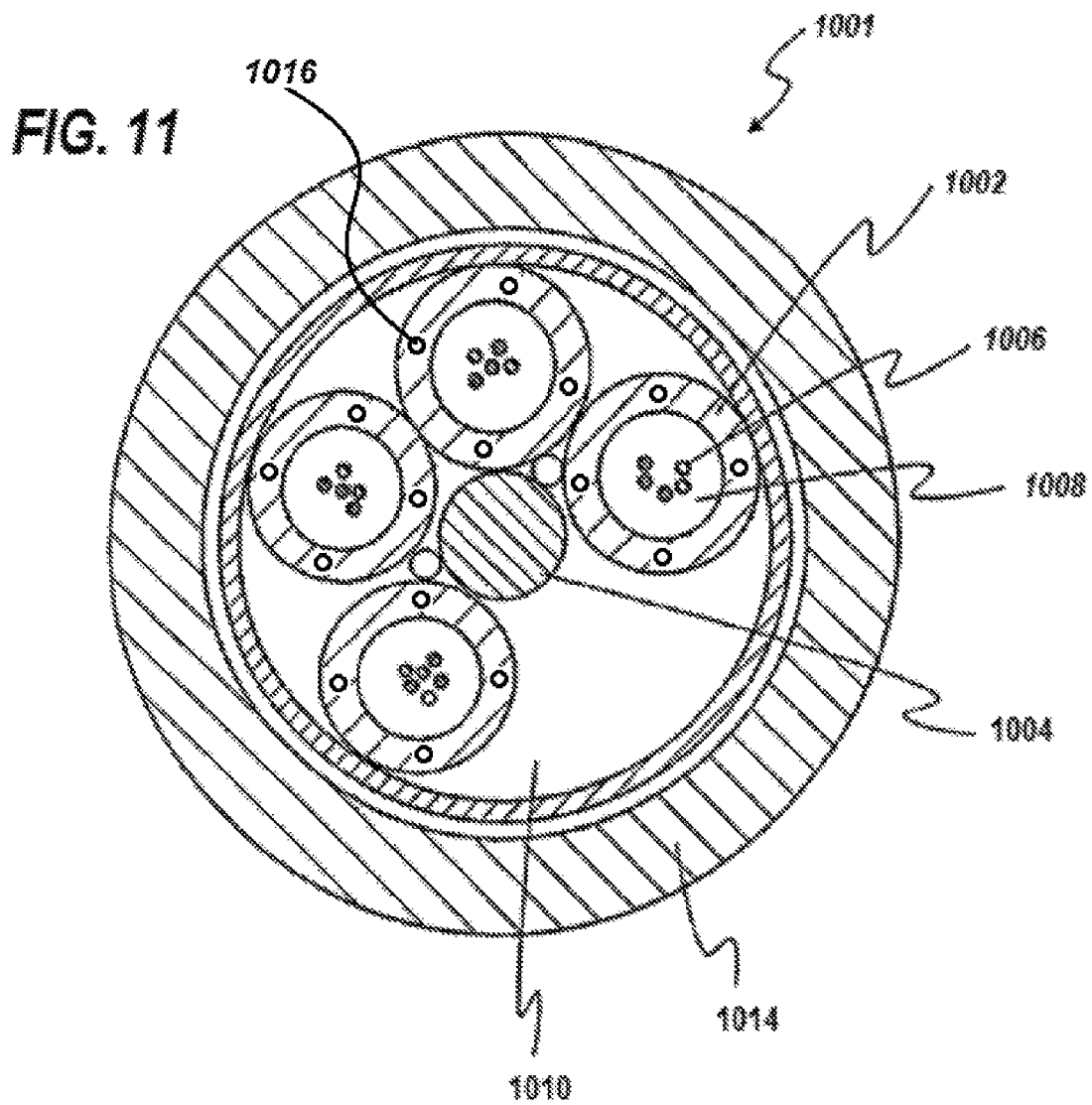
FIG. 11 is a cross-sectional view of a loose buffer tube optical fiber cable.

A cross-sectional view of a common loose buffer tube optical fiber cable design is shown in FIG. 11. In this design of optical fiber cable (1001), buffer tubes (1002) are positioned radially around a central strength member (1004), with a helical rotation to the tubes in the axial length. The helical rotation allows bending of the cable without significantly stretching the tube or the optic fibers (1006).

If a reduced number of buffer tubes is required, then foamed filler rods can be used as low-cost spacers to occupy one or more empty buffer tube positions (1010) to maintain cable geometry. The cable jacket (1014) is generally fabricated from a polyethylene-based material.

The buffer tubes (1002) are typically filled with an optic cable grease or gel (1008). Various gel compounds are available commercially, a number of which are hydrocarbon-based greases incorporating hydrocarbon oils, for example. These greases and gels provide the suspension and protection needed in the immediate environment surrounding the fibers, including eliminating air space. This filling compound (also referred to as "gel" or "grease") provides a barrier against water penetration, which is detrimental to the optic transmission performance.

Many other buffer tube cable designs are possible. The size and materials of construction for the central strength and tensile member, the dimensions and number of buffer tubes, and the use of metallic armors and multiple layers of jacketing material are among the design elements.

Figure 12:
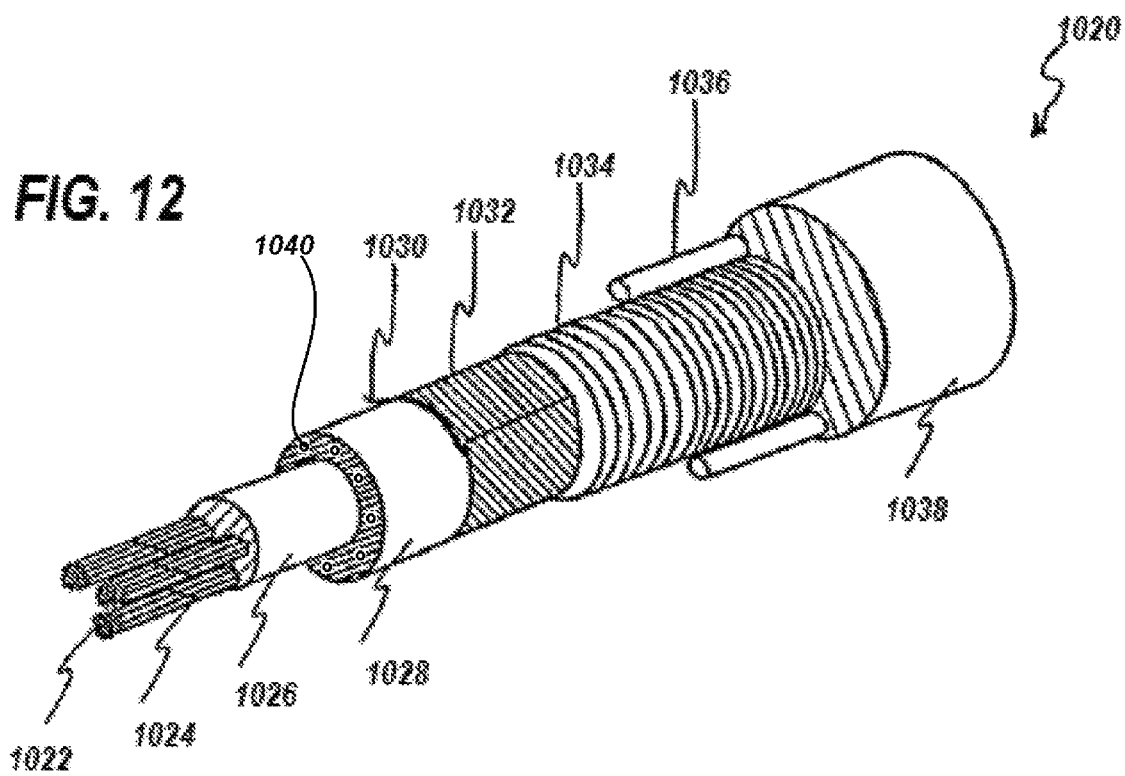
FIG. 12 is a partial cutaway view of a core tube optical fiber cable.

A cross-sectional view of a typical core-tube optical fiber cable, also known as "central tube," is illustrated in FIG. 12. Bundles (1024) of the optical fibers (1022) are positioned near the center of the optical cable (1020) within a central, cylindrical core tube (1028). The bundles are embedded in a filling material (1026). Water blocking tape (1032) surrounds the ripcords (1030), which are on the surface of the core tube (1028). A corrugated, coated steel cylinder (1034) surrounds the tape to protect the bundles (1024). Wire strength members (1036) provide the cable (1020) with strength and stiffness. A jacket (1038), which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

A core tube is typically larger in diameter than a buffer tube to accommodate bundles of fibers or the use of ribbon components containing the optic fibers. Color-coded binders are typically used to bundle and identify the fibers. A core tube can contain water blocking grease or super-absorbent polymer elements surrounding the optic fiber components. The optimal material characteristics for a core tube component are often similar to those of the buffer tube application.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head can comprise any of the die assemblies for producing microcapillary products described above. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

In the instant case, the above-described annular microcapillary products can be used for one or more of the optical fiber cable components described in FIGS. 11 and 12. For example, annular microcapillary products may be employed in making fiber-protection components in typical fiber optic cable constructions, such as the buffer tubes (1002) and the cylindrical core tube (1028). FIG. 11 depicts microcapillaries (1016) disposed in buffer tube (1002). Similarly, FIG. 12 depicts microcapillaries (1040) disposed in the cylindrical core tube (1028). As discussed above, the microcapillaries (1016, 1040) may contain a microcapillary material, such as air.

One or more embodiments of the present invention contemplate a polymeric protective component (e.g., a buffer tube) prepared from an annular microcapillary product having a relatively high-modulus polymeric matrix material and a relatively low-modulus polymeric microcapillary material, where the flexural modulus of the polymeric matrix material is high relative to the polymeric microcapillary material and the flexural modulus of the polymeric microcapillary material is low relative to the polymeric matrix material.

Generally, the high-modulus polymeric matrix material can have a flexural modulus of at least 300,000 psi, or in the range of from 300,000 to 800,000 psi, from 325,000 to 700,000 psi, or in the range of from 330,000 to 600,000 psi. By way of example, a typical flex modulus for poly(p-phenylene sulfide) ("PPS") is about 600,000 psi, for polyether-ether-ketone is about 590,000 psi, for polycarbonate is about 345,000 psi, for polyethylene terephthalate is about 400,000 psi, for polybutylene terephthalate is about 330,000 psi, and for nylon 6/6 is about 400,000 psi (all unfilled).

The high-modulus polymers are generally known as high-performance polymers exhibiting high heat resistance (as measured by the heat deflection temperature for example), excellent mechanical properties, as well as abrasion and chemical resistance properties. They are, however, typically higher density polymers, having densities generally greater than 1.3 $g/cm^3$.

In various embodiments, the polymeric matrix material of the optical fiber buffer tube can comprise polybutylene terephthalate ("PBT"), polyethylene terephthalate ("PET"), a polycarbonate, a polyamide (e.g., a nylon), polyether-ether-ketone ("PEEK"), or combinations of two or more thereof. In an embodiment, the polymeric matrix material of the optical fiber buffer tube comprises PBT.

The low-modulus polymeric microcapillary material can have a flexural modulus of less than 250,000 psi, or in the range of from 100 to 250,000 psi, or from 500 to 200,000 psi. By way of example, a typical high-density polyethylene has a flexural modulus of about 200,000 psi, a typical low-density polyethylene has a flexural modulus of about 30,000 psi, typical thermoplastic polyurethane has a flexural modulus of about 10,000 psi, and a typical polyolefin elastomer (e.g., ENGAGE™ 8402) has a flexural modulus of about 580 psi.

The low-modulus materials are generally characterized by high flexibility and excellent impact resistance, even at low temperatures. These resins can have a melt index ranging from less than 1.0 to greater than 1,000 g/10 minutes such as, for example, AFFINITY™ GA grades of olefin elastomer, commercially available from The Dow Chemical Company. These polyolefin elastomer resins can also have a density as low as 0.857 $g/cm^3$ and a melting point as low as 38° C. such as ENGAGE™ 8842 also from The Dow Chemical Company.

In one or more embodiments, the polymeric microcapillary material of the optical fiber buffer tube can comprise any of the ethylene-based polymers described above (e.g., HDPE, LDPE, EEA, EVA); olefin elastomers (such as described above) and other ethylene copolymers such as AFFINITY™, ENGAGE™, and VERSIFY™ copolymers, commercially available from The Dow Chemical Company; olefin block copolymers (such as those commercially available under the trade name INFUSE™ from The Dow Chemical Company, Midland, Mich., USA), mesophase-separated olefin multi-block interpolymers (such as described in U.S. Pat. No. 7,947,793), olefin block composites (such as described in U.S. Patent Application Publication No. 2008/0269412, published on Oct. 30, 2008), or combinations of two or more thereof. In an embodiment, the polymeric microcapillary material of the optical fiber buffer tube comprises HDPE.

When used in an optical fiber cable construction, the polymeric protective component can have a thickness selected depending on the cable size and construction. In various embodiments, the polymeric protective component can have a thickness ranging from 5 to 20 mils (about 127 to 508 μm). Additionally, the average diameter of the microcapillaries in the polymeric protective component can be selected depending on the thickness chosen for the polymeric protective component. In one or more embodiments, the ratio of the thickness of the polymeric protective component to the average diameter of the microcapillaries can be in the range of from 2:1 to 400:1. Additionally, the spacing of the microcapillaries can be defined relative to the diameter of the microcapillaries. For instance, in various embodiments, the microcapillaries can be spaced apart a distance of less than 1 times the average diameter of the microcapillaries, and can be as high as 10 times the average diameter of the microcapillaries. In various embodiments, the microcapillaries can be spaced apart an average of 100 to 5,000 μm, an average of 200 to 1,000 μm, or an average of 100 to 500 μm.

In various embodiments, the polymeric protective component can have a shrinkback of less than 0.1%, less than 0.08%, less than 0.05%, less than 0.03%, or less than 0.01%. In various embodiments, the polymeric protective component can have a shrinkback of 0%. Shrinkback is determined according to the procedure provided in PCT Published Application WO 2014/099350 at paragraph [0068]. Shrinkback is determined after samples are aged in an oven for five temperature cycles of 40-100-40° C. over a period of 27 hours.

Test Methods

Density

Density is determined according to ASTM D 792.

Melt Index

Melt index, or $I_2$, is measured in accordance with ASTM D 1238, condition 190° C./2.16 kg, and is reported in grams eluted per 10 minutes.

Tensile Strength and Elongation at Break

Measure tensile strength and elongation according to ASTM method D 638.

Materials

The following materials are employed in the Examples, below.

AXELERON™ GP C-0588 BK ("LDPE") is a low-density polyethylene having a density of 0.932 g/cm³, a melt index ($I_2$) in the range of from 0.2 to 0.4 g/10 min., and containing carbon black in an amount ranging from 2.35 to 2.85 wt % (ASTM D1603). AXELERON™ GP C-0588 BK is commercially available from The Dow Chemical Company, Midland, Mich., USA.

AXELERON™ FO 6548 BK ("MDPE") is a medium-density polyethylene having a density of 0.944 g/cm³, a melt index ($I_2$) in the range of from 0.6 to 0.9 g/10 min., and containing carbon black in an amount ranging from 2.35 to 2.85 wt % (ASTM D1603). AXELERON™ FO 6548 BK is commercially available from The Dow Chemical Company, Midland, Mich., USA.

The blowing agent is a masterbatch that contains 50 wt % azodicarbonamide mixed in a linear-low-density polyethylene ("LLDPE") base resin. The LLDPE used in the blowing agent masterbatch has a density of 0.924 g/cm³ and a melt index of 20 g/10 min. The blowing agent masterbatch is produced by The Dow Chemical Company, Midland, Mich., USA.

EXAMPLES

Sample Preparation

Microcapillary Samples

Prepare four samples (S1-S4) using a tape-extrusion system consisting of a single-screw extruder (3.81-cm Killion extruder) fitted with a microcapillary die capable of handling a polymer melt and an air stream, as schematically depicted in FIG. 1. The die to be used in these Examples is described in detail in PCT Published Patent Application No. WO 2014/003761, specifically with respect to FIGS. 4A and 4A1, and the corresponding text of the written description, which is incorporated herein by reference. The die has 42 microcapillary nozzles, a width of 5 cm, and a die gap of 1.5 mm. Each microcapillary nozzle has an outer diameter of 0.38 mm and an inner diameter of 0.19 mm. The plant air is supplied by an air line with a flow meter, which is fully open prior to heating the machine to prevent blockage of the microcapillary nozzles by the backflow of polymer melt. In preparing the microcapillary sheets, first the extruder, gear pump, transfer lines, and die are heated to the operating temperatures with a "soak" time of about 30 minutes. Operating temperatures are shown in Table 1. As the polymer pellets pass through the extruder screw, the polymer becomes molten. The extruder screw feeds the polymer melt to the gear pump, which maintains a substantially constant flow of polymer melt towards the microcapillary die. Next, the polymer melt passes over the microcapillary nozzles and meets with streamlines of air flow, which maintain the size and shape of the microcapillary channels. Upon exiting the extrusion die, the extrudate is passed over a chill roll. Once the extrudate is quenched, it is taken by a nip roll. The air flow rate is carefully adjusted in such a way that the microcapillaries do not blow out but maintain reasonable microcapillary dimensions. The line speed is controlled by a nip roll in the rollstack. The sample compositions, their properties, and other process parameters are provided in Table 2, below.

TABLE 1

Temperature Profile of Microcapillary Extrusion Line for Air-Filled Microcapillary Sheets.

| Extruder Zone 1 (° F.) | Extruder Zone 2 (° F.) | Extruder Zone 3 (° F.) | Extruder Zone 4 (° F.) | Adaptor Zone (° F.) | Transfer Line (° F.) | Screen Changer (° F.) | Feed block (° F.) | Die Zone (° F.) |
|---|---|---|---|---|---|---|---|---|
| 374 | 392 | 410 | 428 | 428 | 428 | 428 | 428 | 428 |

The resulting tapes are about 1.6 inches wide and approximately 40-50 mils thick, and have the following properties, shown in Table 2.

TABLE 2

Composition and Properties of Samples S1-S4

|  | S1 | S2 | S3 | S4 |
|---|---|---|---|---|
| LDPE (wt %) | 100 | 100 | — | — |
| MDPE (wt %) | — | — | 100 | 100 |
| Air Flow Rate (mL/min) | 20 | 40 | 20 | 40 |
| Line Speed (ft/min) | 6 | 6 | 6.6 | 7.2 |
| Average Film Thickness (mm) | 1.036 | 1.214 | 0.996 | 1.057 |
| Average Film Width (cm) | 4.2 | 4.2 | 4.1 | 4.1 |
| Area Percentage of Microcapillaries in the Film (%) | 22.5 | 31.2 | 27.5 | 35 |
| Long Axis of a Microcapillary (mm) | 0.722 | 0.804 | 0.718 | 0.769 |
| Short Axis of a Microcapillary (mm) | 0.355 | 0.519 | 0.389 | 0.504 |
| Space between Two Microcapillaries (mm) | 0.264 | 0.196 | 0.263 | 0.210 |
| Film Surface to Inner Surface of Microcapillary (mm) | 0.33 | 0.352 | 0.282 | 0.279 |

Foamed Samples

Prepare two Comparative Samples (CS1 and CS2) by foaming an LDPE (C-0588) and MDPE (6548) according to the following method. Heat a Brabender mixer up to 130° C. The Brabender mixer model is a Prep-Mixer®/Measuring Head laboratory electric batch mixer equipped with cam rotors. The Prep-Mixer® is a 3-piece design consisting of two heating zones with a capacity of 350/420 mL depending on mixer-blade configuration. Load the polyethylene resin, bring it to flux, and melt while mixing at a 20-rpm rotor speed. Add in the blowing agent masterbatch and mix at 20 rpm for five minutes. The foamable compounds are then extruded in a single-screw extruder equipped with a tape die and pickup belt to a foamed tape 45-mil thick. In each Comparative Sample, the polyethylene is present in an amount of 99.5 wt %, and the blowing agent masterbatch is present in an amount of 0.5 wt %.

Control Samples

Control sample 1 ("Control 1") is unmodified C-0588 LDPE. Control sample 2 ("Control 2") is unmodified 6548 MDPE. Tape samples of Control 1 and 2 are prepared by a microcapillary line that consists of a 3.81-cm Killion single-screw extruder to supply polymer melt for the matrix material and a 1.9-cm Killion single-screw extruder to supply polymer melt for the microcapillaries via a transfer line to the microcapillary die, which is the same as described above with respect to S1-S4. The control samples are prepared as follows. First, the extruders, gear pump, transfer lines and die are heated to the operating temperatures with a 30-minute "soak" time. The temperature profile for the 3.81-cm Killion single-screw extruder is given in Table 1, above, and the temperature profile for 1.9-cm Killion single-screw extruder is given in Table 3, below. Polymer resins are charged into the hopper of the 1.9-cm Killion single-screw extruder, and the screw speed is turned up to the target value (30 rpm). As the polymer melt exits the microcapillary nozzles, the same polymer resins as used for the microcapillaries are filled into the hopper of 3.81-cm Killion single-screw extruder and the main extruder is turned on. The extruder screw of 3.81-cm Killion single-screw extruder feeds the melt to a gear pump, which maintains a substantially constant flow of melt towards the microcapillary die. Then, the polymer melt from the 3.81-cm Killion single-screw extruder is divided into two streams, which meets with polymer strands from microcapillary nozzles. Upon exiting the extrusion die, the extrudate is cooled on a chill roll on a rollstack. Once the extrudate is quenched, it is taken by a nip roll. The line speed is controlled by a nip roll in the rollstack.

TABLE 3

Temperature Profiles of 1.9-cm Killion Single-Screw Extruder for Making Control Samples

| Extruder Zone 1 (° F.) | Extruder Zone 2 (° F.) | Extruder Zone 3 (° F.) | Transfer Line (° F.) |
|---|---|---|---|
| 338 | 410 | 428 | 428 |

Example 1—LDPE Microcapillary Tape Analysis

Analyze each of S1, S2, CS1, and Control 1 according to the Test Methods provided above. The results are provided in Table 4, below.

TABLE 4

Properties of S1, S2, CS1, and Control 1

|  | Control 1 | CS1 | S1 | S2 |
|---|---|---|---|---|
| Tensile Strength ("TS") (psi) | 2,836 | 1,330 | 2,229 | 2,040 |
| Reduction in TS (%)* | — | 53 | 21 | 28 |
| Elongation at Break ("EB") (%) | 661 | 434 | 583 | 598 |
| Reduction in EB (%)* | — | 34 | 12 | 10 |
| Density (g/cm$^3$) | 0.932 | 0.766 | 0.752 | 0.695 |
| Reduction in Density (%)* | — | 18 | 19 | 25 |

*Reduction relative to Control 1

As can be seen from the results provided in Table 4, reductions in tensile strength and elongation at break are significantly less for the microcapillary samples (S1 and S2) compared to the foamed sample (CS1), though all three had comparable reductions in density.

Example 2—MDPE Microcapillary Tape Analysis

Analyze each of S3, S4, CS2 and Control 2 according to the Test Methods provided above. The results are provided in Table 5, below.

TABLE 5

Properties of S3, S4, CS2, and Control 2

|  | Control 2 | CS2 | S3 | S4 |
|---|---|---|---|---|
| Tensile Strength ("TS") (psi) | 4,666 | 1,894 | 3,168 | 2,530 |
| Reduction in TS (%)* | — | 59 | 32 | 46 |
| Elongation at Break ("EB") (%) | 910 | 75 | 808 | 693 |
| Reduction in EB (%)* | — | 92 | 11 | 24 |
| Density (g/cm$^3$) | 0.944 | 0.765 | 0.816 | 0.630 |
| Reduction in Density (%)* | — | 19 | 14 | 33 |

*Reduction relative to Control 2

As can be seen from the results provided in Table 5, reductions in tensile strength and elongation at break are significantly less for the microcapillary samples (S3 and S4) compared to the foamed sample (CS2). Sample S4 is particularly surprising, given its significantly greater reduction in density relative to CS2 but greater retention of mechanical properties.

The invention claimed is:

1. A coated conductor, comprising:
   (a) a conductor; and
   (b) an annular, elongated polymeric coating surrounding at least a portion of said conductor,
   wherein said annular, elongated polymeric coating comprises a polyolefin polymeric matrix material and a plurality of microcapillaries which extend substantially in the direction of elongation of said elongated polymeric coating,
   wherein said microcapillaries define individual, discrete spaces surrounded by said polyolefin polymeric matrix material when viewed from a cross section taken orthogonal to the direction of elongation of said elongated polymeric coating and wherein a portion of said microcapillaries define void spaces and contain air within said void spaces,
   wherein said annular, elongated polymeric coating is a jacket,
   wherein at least a portion of said microcapillaries contain a polyolefin elastomeric microcapillary material and at least one of the polyolefin polymeric matrix material and the polyolefin elastomeric microcapillary material comprises an adhesion promotor which increases adhesion between the polyolefin polymeric matrix material and the polyolefin elastomeric microcapillary material.

2. The coated conductor of claim 1, wherein an aggregate of said spaces defined by said microcapillaries constitutes at least 10 volume percent of the total volume of said polymeric coating.

3. The coated conductor of claim 1, wherein said microcapillaries have an average diameter in the range of from 0.5 µm to 2,000 µm, wherein said microcapillaries have a cross-sectional shape selected from the group consisting of circular, rectangular, oval, star, diamond, triangular, square, curvilinear, and combinations thereof, wherein said elongated polymeric coating has a thickness in the range of from 15 to 120 mils.

4. The coated conductor of claim 1, wherein the ratio of the thickness of said polymeric coating to the average diameter of said microcapillaries is in the range of from 2:1 to 400:1.

5. The coated conductor of claim 1, wherein said polymeric coating has a reduction in tensile strength of less than 50% relative to an identical coating prepared from the same matrix material except not having microcapillaries.

6. The coated conductor of claim 1, wherein said polymeric coating has a reduction in elongation-at-break of less than 30% relative to an identical coating prepared from the same matrix material except not having microcapillaries.

7. The coated conductor of claim 1, wherein said polymeric coating has a density that is at least 10 percent less than a comparative polymeric coating prepared from the same matrix material but not containing any microcapillaries.

8. The coated conductor of claim 1, wherein said matrix material comprises an ethylene-based polymer.

9. The coated conductor of claim 8, wherein said polymeric matrix material is present in the form of a multi-layer construction.

* * * * *